US011982968B2

(12) United States Patent
Sato

(10) Patent No.: US 11,982,968 B2
(45) Date of Patent: May 14, 2024

(54) IMAGE FORMING APPARATUS WITH TWO CORRECTING PORTIONS THAT CORRECT A POSITION OF A SHEET IN THE WIDTH DIRECTION

(71) Applicant: CANON KABUSHIKI KAISHA, Tokyo (JP)

(72) Inventor: Kengo Sato, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 54 days.

(21) Appl. No.: 17/696,979

(22) Filed: Mar. 17, 2022

(65) Prior Publication Data

US 2022/0299928 A1 Sep. 22, 2022

(30) Foreign Application Priority Data

Mar. 19, 2021 (JP) ................................ 2021-046123

(51) Int. Cl.
*G03G 15/00* (2006.01)

(52) U.S. Cl.
CPC ..... *G03G 15/6567* (2013.01); *G03G 15/6564* (2013.01)

(58) Field of Classification Search
CPC ........ G03G 15/6558–6567; G03G 2215/0043; G03G 2215/00438; B65H 7/10; B65H 9/002; B65H 2404/1424
See application file for complete search history.

(56) References Cited

U.S. PATENT DOCUMENTS

| | | | |
|---|---|---|---|
| 5,091,754 A | 2/1992 | Abe et al. | |
| 5,154,411 A | 10/1992 | Saito et al. | |
| 5,172,138 A | 12/1992 | Okazawa et al. | |
| 5,196,885 A | 3/1993 | Takeuchi et al. | |
| 5,303,015 A | 4/1994 | Sato | |
| 5,334,817 A | 8/1994 | Nakamori et al. | |
| 5,450,170 A | 9/1995 | Kimizuka et al. | |
| 5,481,336 A | 1/1996 | Tachibana et al. | |
| 5,615,872 A * | 4/1997 | Mochimaru ....... | G03G 15/6532 271/301 |
| 5,713,060 A | 1/1998 | Sato et al. | |

(Continued)

FOREIGN PATENT DOCUMENTS

| | | |
|---|---|---|
| JP | 2005070457 A * | 3/2005 |
| JP | 2009-143643 A | 7/2009 |
| JP | 2012056668 A * | 3/2012 |

*Primary Examiner* — Justin N Olamit
(74) *Attorney, Agent, or Firm* — Venable LLP

(57) ABSTRACT

An image forming apparatus includes an image bearing member, a transfer portion, first and second correcting portions including first and second roller pairs and first and second detectors, respectively. The first and second correcting portions correct a sheet position in a widthwise direction. A controller, in a case the sheet is fed to the transfer portion via the first correcting portion from the second correcting portion, causes the first correcting portion to correct the sheet position to a first position to be aligned with the image transferred in the transfer position and causes the second correcting portion to correct the sheet position to a second position. When the sheet has been moved to a reference position by the second roller pair, the second position is a position offset from the reference position toward an opposite side to a direction where the sheet position detected by the first detector is shifted from the first position.

9 Claims, 17 Drawing Sheets

(56) References Cited

U.S. PATENT DOCUMENTS

| | | | |
|---|---|---|---|
| 5,819,134 | A | 10/1998 | Sato et al. |
| 5,875,373 | A | 2/1999 | Sato et al. |
| 6,008,829 | A | 12/1999 | Wakamiya et al. |
| 6,449,445 | B1 | 9/2002 | Nakamori et al. |
| 6,487,379 | B2 | 11/2002 | Sato |
| 6,496,660 | B2 | 12/2002 | Takahashi et al. |
| 6,581,922 | B2 | 6/2003 | Kuwata et al. |
| 6,674,976 | B2 | 1/2004 | Sato et al. |
| 6,785,478 | B2 | 8/2004 | Takahashi et al. |
| 8,292,293 | B2 * | 10/2012 | Inoue ..................... B65H 9/002 271/227 |
| 8,408,830 | B2 | 4/2013 | Ogata et al. |
| 9,348,291 | B2 * | 5/2016 | Yamamoto ......... G03G 15/6564 |
| 9,442,450 | B2 | 9/2016 | Sato et al. |
| 9,632,471 | B2 | 4/2017 | Sato et al. |
| 9,769,327 | B2 * | 9/2017 | Yamazaki .............. B65H 9/106 |
| 10,106,355 | B2 | 10/2018 | Sato |
| 10,442,645 | B2 * | 10/2019 | Deno ....................... B65H 7/10 |
| 10,577,207 | B2 | 3/2020 | Sato |
| 11,196,884 | B2 | 12/2021 | Sato |
| 2009/0154975 | A1 | 6/2009 | Ogata et al. |
| 2018/0011439 | A1 | 1/2018 | Sato |

* cited by examiner

IMAGE FORMING APPARATUS WITH TWO CORRECTING PORTIONS THAT CORRECT A POSITION OF A SHEET IN THE WIDTH DIRECTION

FIELD OF THE INVENTION AND RELATED ART

The present invention relates to an image forming apparatus that forms an image on a sheet.

Image forming apparatuses such as printers, copiers, and multifunction devices are equipped with a registration mechanism that aligns the image with the sheet used as a recording material. The registration mechanism is known to correct the position shift of the sheet in the widthwise direction to align with the position of the image to be transferred to the sheet by shifting the roller pair nipping the sheet in the widthwise direction (the direction orthogonal to the sheet feeding direction).

In the registration mechanism that corrects the widthwise direction position of a sheet, the movement amount (shift amount) of the roller pair in the shift motion should be small. In the Japanese Laid-Open Patent Application No. 2009-143643, a technique for changing the starting position of transferring an electrostatic latent image to a photosensitive member in an image forming portion based on the result of detecting the edge position of a material by a photo sensor array is described, which reduces the shift amount of the roller pair in the shift motion.

However, the image forming apparatus described in Japanese Laid-Open Patent Application No. 2009-143643 corrects the sheet position with a single shift motion by a pair of rollers placed immediately before the transfer portion. Therefore, if the sheet has shifted its position significantly by the time it reaches the roller pair, the shift amount of the roller pair becomes large. In this case, if the shift amount of the roller pair located immediately before the transfer portion is large, the time required for the shift motion and the time required to return the rollers to the predetermined position (home position) after the shift motion become long, and the productivity of the image forming apparatus decreases.

In addition, if the sheet is moved significantly in the widthwise direction immediately before the transfer portion, twisting and wrinkling may occur in the sheet, resulting in skewing of the sheet that leads to a decrease in image quality and a decrease in position correction accuracy. Therefore, it has been desired to reduce the shift amount of the roller pair located immediately before the transfer portion.

SUMMARY OF THE INVENTION

The objective of the present invention is to provide an image forming apparatus capable of reducing the movement amount of the roller pair that corrects the position of the sheet widthwise direction immediately before the transfer portion.

According to one embodiment of the present invention, there is provided an image forming apparatus comprising: an image forming portion including an image bearing member configured to bear an image and a transfer portion configured to transfer the image formed on said image bearing member to a sheet; a first correcting portion including a first roller pair configured to nip and feed the sheet and movable in a widthwise direction perpendicular to a sheet feeding direction, and a first detecting means for detecting a sheet position with respect to the widthwise direction, said first correcting portion correcting a position of the sheet in the widthwise direction by said first roller pair on the basis of a detecting result of said first detecting means, and feeding the sheet toward said transfer portion; a second correcting portion including a second roller pair configured to nip and feed the sheet and movable in the widthwise direction and a second detecting means for detecting the sheet position with respect to the widthwise direction, said second correcting portion correcting the position of the sheet in the widthwise direction by said second roller pair on the basis of a detecting result of said second detecting means, and feeding the sheet toward said first correcting portion; and a controller configured to control said first correcting portion and said second correcting portion, wherein said controller, in a case in which the sheet is fed to said transfer portion, to form the image on the sheet, via said first correcting portion from said second correcting portion, causes said first correcting portion to correct the position of the sheet to a first position to be aligned with the image transferred in said transfer position and causes said second correcting portion to correct the position of the sheet to a second position, and wherein, when the sheet has been moved to a predetermined reference position by said second roller pair, the second position is a position offset from the reference position toward an opposite side to a direction where the position of the sheet detected by said first detecting means is shifted from the first position.

Further features of the present invention will become apparent from the following description of exemplary embodiments (with reference to the attached drawings).

DESCRIPTION OF THE EMBODIMENTS

The following is a description of an exemplary embodiment of the present invention with reference to the drawings.

First Embodiment

[Overview of a Printer]

Figure 1:
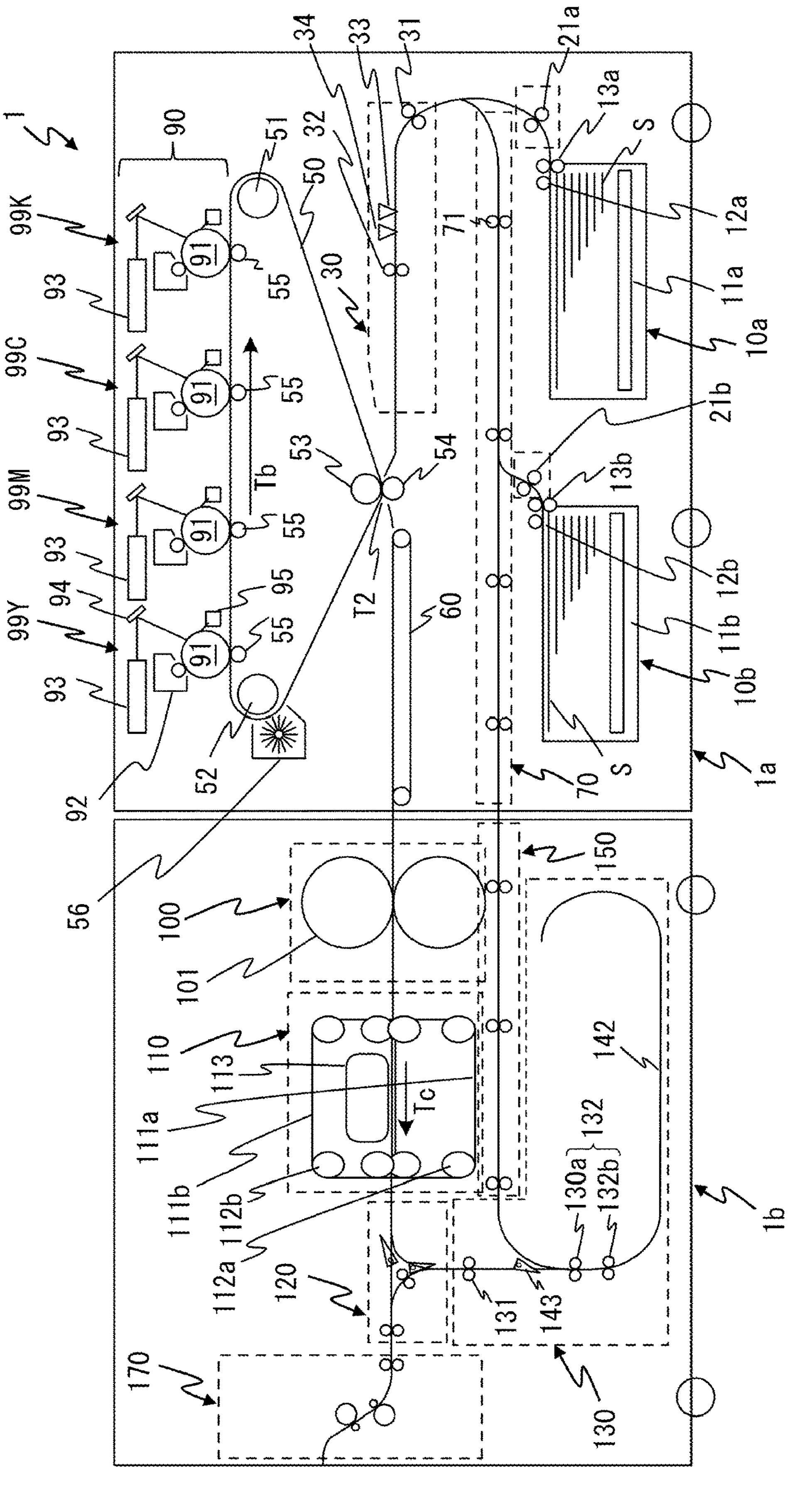
FIG. 1 is a schematic view showing a printer according to the first embodiment.

A first embodiment is described below. A printer 1 as an image forming apparatus for the present embodiment is a full-color laser beam printer of an electrophotographic type. As shown in FIG. 1, the printer 1 is divided into a first casing 1*a*, which feeds the sheets and forms images, and a second casing 1*b*, which fixes the images and cools the sheets.

The first casing 1*a* includes feeding units 10*a*, 10*b*, drawing roller pairs 21*a*, 21*b*, a registration portion 30, an image forming portion 90, and a first double-side feeding portion 70. The second casing 1*b* includes a fixing unit 100, a cooling unit 110, a branch feeding portion 120, a reverse feeding portion 130, a second double-side feeding portion 150, and a decurling unit 170.

The image forming portion 90 includes four process cartridges 99Y, 99M, 99C, and 99K, which form toner images in four colors: yellow (Y), magenta (M), cyan (C), and black (K), respectively. The image forming portion 90 also includes an exposure device 93 that corresponds to each process cartridge 99Y-99K. Incidentally, the four process cartridges 99Y-99K have substantially the same constitution, except that the colors of the formed images are different.

Each process cartridge 99Y-99K has a photosensitive drum 91, which is an image bearing member (electrophotographic photosensitive member), a charging roller, a developing device 92, and a cleaner 95. The photosensitive drum 91 is constituted by applying an organic photoconductor layer on an outer peripheral surface of an aluminum cylinder and is rotated by a driving motor. The image forming portion 90 is provided with an intermediary transfer belt 50 that is rotated in the direction of arrow Tb by a driving roller 52. The intermediary transfer belt 50, which is an intermediate transfer material, is wound around a tension roller 51, a driving roller 52, and a secondary transfer inner roller 53. On the inner side of the intermediary transfer belt 50, there is a primary transfer roller 55 corresponding to each photosensitive drum 91, and on the outer side of the intermediary transfer belt 50, there is a secondary transfer outer roller 54 opposite to the secondary transfer inner roller 53. An intermediary transfer unit including an intermediary transfer belt 50, a primary transfer roller 55 and a secondary transfer outer roller 54 functions as the transfer means for transferring the image formed on the image bearing member to the sheet. A secondary transfer portion T2, which is a nip portion formed by the secondary transfer inner roller 53 and the secondary transfer outer roller 54, is the transfer portion of the present embodiment where the image is transferred to the sheet S, which is the recording material.

The feeding unit 10*a* includes a lift plate 11*a* for raising and lowering sheets S while stacking the sheets S, a pick-up roller 12*a* for feeding the sheets S stacked on the lift plate 11*a*, and a separation roller pair 13*a* for separating the fed sheets S one by one. Similarly, the feeding unit 10*b* includes a lift plate 11*b* for raising and lowering sheets S while stacking the sheets S, a pick-up roller 12*b* for feeding the sheets S stacked on the lift plate 11*b*, and a separation roller pair 13*b* for separating the fed sheets S one by one.

A registration portion 30 includes a pre-registration roller pair 31 that feeds the sheet S, and a registration roller pair 32 that corrects the oblique movement (skew) and the position of the sheet S in the widthwise direction. The registration portion 30 also includes a registration sensor 33 that detects the position of the sheet S in the sheet feeding direction, and a contact image sensor (hereinafter referred to as CIS) 34 to detect the position of the sheet S in the widthwise direction.

The widthwise direction of the sheet S in the registration portion 30 is the direction perpendicular to the feeding direction of the sheet S by the registration roller pair 32, and is the direction of the rotational axis of the rollers constituting the registration roller pair 32. The widthwise direction of the sheet S in the reverse feeding portion 130 described below is the same as the widthwise direction of the sheet S in the registration portion 30. Therefore, hereinafter, we will refer to the same direction without depending on the position of the sheet S on the feeding passage in the printer 1 as "widthwise direction of sheet S" or simply "widthwise direction."

A fixing unit 100 includes a fixing roller pair 101 that forms a nip portion that nips a sheet S, and heating means such as a halogen lamp or an induction heating mechanism that heats at least one roller of the fixing roller pair 101. A cooling unit 110 includes an upper cooling belt 111*a* which is rotated along the arrow Tc by an upper driving roller 112*a*. Similarly, the cooling unit 110 includes a lower cooling belt 111*b* that is rotated along the arrow Tc by a lower driving roller 112*b*. The cooling unit 110 includes a heat sink 113 that promotes heat dissipation of the upper cooling belt 111*a* and the lower cooling belt 111*b*.

Next, the image forming operation of the printer 1 constituted in this way is explained. When an image forming instruction (print execution instruction) is given to the printer 1 from a PC, etc., the photosensitive drum 91 of the process cartridge 99Y rotates, and the charging roller uniformly charges the surface of the photosensitive drum 91 to a predetermined polarity and potential. The image information is converted into an image signal that drives an exposure device 93 and is input to the exposure device 93, which then emits a laser beam corresponding to the image signal toward the surface of the photosensitive drum 91. As a result, the photosensitive drum 91 is exposed and an electrostatic latent image corresponding to the yellow image component is formed on the surface of the photosensitive drum 91. The electrostatic latent image formed on the photosensitive drum 91 is developed by a developing device 92 using a developer containing yellow toner, and a yellow toner image is formed on the photosensitive drum 91.

In other process cartridges 99M, 99C, and 99K, the same process is used to charge, expose, and develop the photosensitive drum 91 to form magenta, cyan, and black toner images on each photosensitive drum 91. The toner images of each color formed on each photosensitive drum 91 are transferred (primary transfer) to the intermediary transfer belt 50 by the primary transfer roller 55. Any remaining toner that is not transferred and remains on the photosensitive drum 91 of the intermediary transfer belt 50 is removed by a cleaner 95. The process of creating toner images in each of the process cartridges 99Y-99K is performed at a time when the toner images of each color overlap each other on the intermediary transfer belt 50 during primary transfer. As a result, a full-color toner image is formed on the intermediary transfer belt 50, in which the toner images of the four colors are superimposed. The full-color toner image is fed to a secondary transfer portion T2 by the intermediary transfer belt 50, which is rotated by a driving roller 52.

In parallel with the above-mentioned process (image forming process) in the image forming portion 90, sheets S are fed one by one from one of the feeding units 10*a*, 10*b*. Furthermore, sheets S are fed to the registration portion 30 by one of the drawing roller pairs 21*a*, 21*b*. In the registration portion 30, the preregistration roller pair 31 corrects the oblique movement of the sheet S by pressing the tip of the sheet S against the nip portion of the stopped registration roller pair 32. Then, the registration roller pair 32 feeds the sheet S to the secondary transfer portion T2 at a predetermined feeding timing.

The full-color toner image on the intermediary transfer belt 50 is transferred to the first surface of the sheet S by the secondary transfer bias applied to the secondary transfer outer roller 54. The residual toner that remains on the intermediary transfer belt 50 without being transferred to the sheet S is collected by a belt cleaner 56.

The sheet S on which the toner image has been transferred is transported by the pre-fixing feeding section 60 to the fixing unit 100. Then, the sheet S is guided to a nip portion of a fixing roller pair 101, and while being nipped and fed by the nip portion, the predetermined heat and predetermined pressure are applied. As a result, the toner on the sheet S melts and then adheres to the sheet S, resulting in a fixed image on the sheet S. The sheet S that has passed through the fixing unit 100 is nipped between an upper cooling belt 111*a* and a lower cooling belt 111*b*, which are endless belts, in the cooling unit 110, and is fed by the rotation of an upper driving roller 112*a* and a lower driving roller 112*b*. While feeding the sheet S, the cooling unit 110 absorbs the heat of the sheet S by the upper cooling belt 111*a* and the lower cooling belt 111*b*, and dissipates it by a heat sink 113, thus cooling the sheet S.

Subsequently, the branch feeding unit 120 selects a route to feed the sheet S to the decurling unit 170 or to the reverse feeding portion 130. When an image is formed on only one side of the sheet S, the sheet S with the image formed on the first side is fed from the branch feeding unit 120 to the decurling unit 170. The decurling unit 170 corrects the curl of the sheet S by using a hard roller with a small diameter and a soft roller with a large diameter. The sheet S that has passed through the decurling unit 170 is discharged onto a discharge tray provided outside the second casing 1*b*, or is passed on to a discharge option device.

In the case of double-sided printing, where images are formed on both sides of the sheet S, the sheet S with the image formed on the first side is fed by the branch feeding unit 120 to the reverse feeding portion 130 and is switched back in the reverse feeding portion 130. The switched-back sheet S is guided from the reverse feeding portion 130 through a second double-side feeding portion 150 and a first double-side feeding portion 70 to the registration portion 30 again. After this, the image is transferred to the second side (back side) of the sheet S, which is opposite to the first side, in the secondary transfer portion T2 in the same process as the first side, and undergoes image fixing treatment in the fixing unit 100. The sheet S is then discharged via the branch feeding unit 120 and the decurling unit 170 to an ejection tray outside the second casing 1*b*, or passed to a discharge option device.

Using the branch feeding unit 120 and the reverse feeding portion 130, the printer 1 can perform the operation of discharging the sheet S so that the image side is on the bottom (face-down discharge). In other words, after the sheet S with an image formed on the first side is fed from the branch feeding unit 120 to the reverse feeding portion 130, the sheet S is reversed so that the first side, which is the image side, is the bottom side, and then fed to the decurling unit 170.

In the present embodiment, the sheet position is controlled so that the center of the widthwise direction of the sheet S is aligned with the center of the widthwise direction of the sheet feeding passage. The printer 1 uses the so-called sheet feeding type on a center basis. The following explanation assumes that the printer 1 uses the sheet feeding type on a center basis.

[System Configuration of the Printer]

Figure 8:
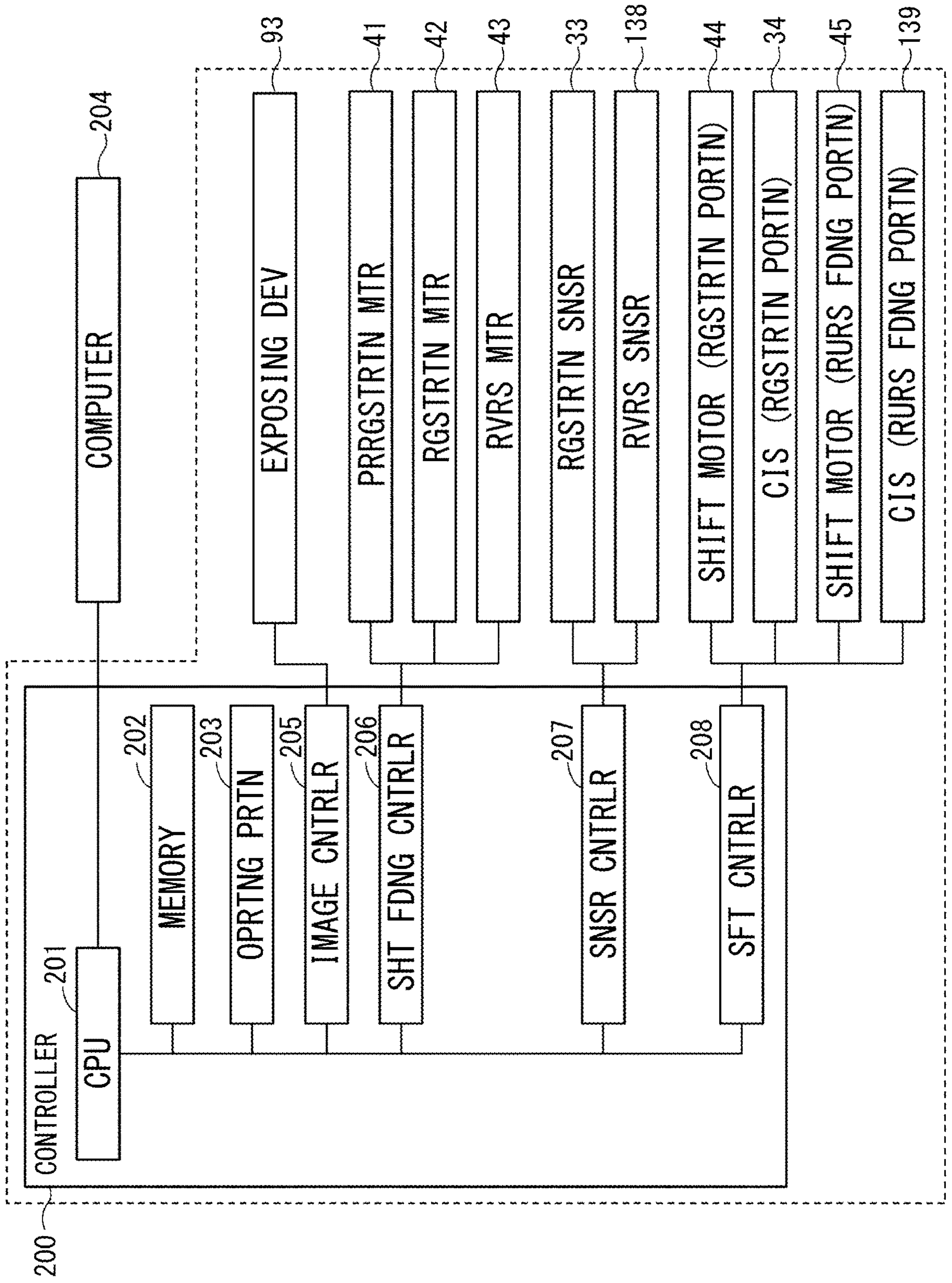
FIG. 8 a block diagram showing the system configuration of a printer according to the first embodiment.

FIG. 8 shows a block diagram of the hardware configuration of printer 1. The printer 1 is equipped with a control portion 200 as a controller that controls the operation of the printer 1. The control unit 200 has a CPU 201, a memory 202, an operation portion 203, an image forming control portion 205, a sheet feeding control portion 206, a sensor control portion 207, and a shift control portion 208.

The CPU 201 reads and executes the control program of the printer 1, and issues instructions to the control modules (205, 206, 207, 208) for each function to control each part of the printer 1. The memory 202 is the storage location for the control program and the data necessary for executing the control program, as well as the work location for the CPU 201 to execute the control program. The memory 202 is an example of a non-transitory storage medium that stores the program for controlling the printer 1 with the control method described below.

The operation portion 203, which is the user interface of the printer 1, includes input devices such as the print execution button, numeric keypad, and touch panel of the LCD panel, and display devices such as the LCD panel and LED lamps. The image forming control portion 205 is a module that controls the operation of the image forming portion 90. For example, it instructs the exposure device 93 where to start writing the electrostatic latent image on the photosensitive drum 91.

The sheet feeding control portion 206 is a module that controls the feeding operation of the sheet S. It controls the motors that drive the roller pairs disposed along the feeding passage of the sheet S. Specifically, the sheet feeding control portion 206 controls the preregistration motor 41 that rotates and drives the preregistration roller pair 31, and the registration motor 42 that rotates and drives the registration roller pair 32. In addition, the sheet feeding control portion 206 controls the reversing motor 43 that rotates and drives the first reversing roller pair 132*a* and the second reversing roller pair 132*b* of the reverse feeding portion 130 described below.

The sensor control portion 207 transmits detection results of various sensors arranged in the printer 1 to the CPU 201. For example, the sensor control portion 207 communicates to the CPU 201 that the leading edge or the trailing edge of the sheet has passed the detection position of a registration sensor 33 or a reversal sensor 138 based on the detection signal of the registration sensor 33 or the reversal sensor 138 described below. As the registration sensor 33 and the reversal sensor 138, which are sheet detecting means, for example, an optical sensor that irradiates light toward the transport path and detects the presence or absence of reflected light from the sheet can be used.

The shift control portion 208 is a module that controls the position correction of the sheet S with respect to the widthwise direction D2 in the registration portion 30 and the reverse feeding portion 130 described below. For example, the shift control portion 208 controls the position correction of the sheet S with respect to C For example, the shift control portion 208 controls the shift motor 44 based on the result of the detection of the side edge position of the sheet S by the CIS 34 of the registration portion 30 by controlling the movement of the registration roller pair 32 (also called shift motion or lateral registration shift motion). The shift control portion 208 also controls the shift motion in the reverse feeding portion 130 by controlling the shift motor 45 based on the detection result of the side edge position of the sheet S by the CIS 139 of the reverse feeding portion 130.

The control portion 200 is connected to an external computer 204 via a network. When the control unit 200 receives a print execution instruction from the computer 204, it executes image forming operations by controlling various motors and sensors through function-specific modules (203, 205, 206, 207, 208).

The image forming control portion 205 and the sheet feeding control portion 206 are examples of an image forming controller that controls image formation and a sheet feeding controller that controls sheet feeding motion, respectively. The sensor control portion 207 and the shift control portion 208 are examples of a sensor controller that controls the sensor and a shift controller (position correction controller) that controls the shift motion. Each of these modules may be part of a control program executed by the CPU 201.

[Registration Unit]

Figure 2:
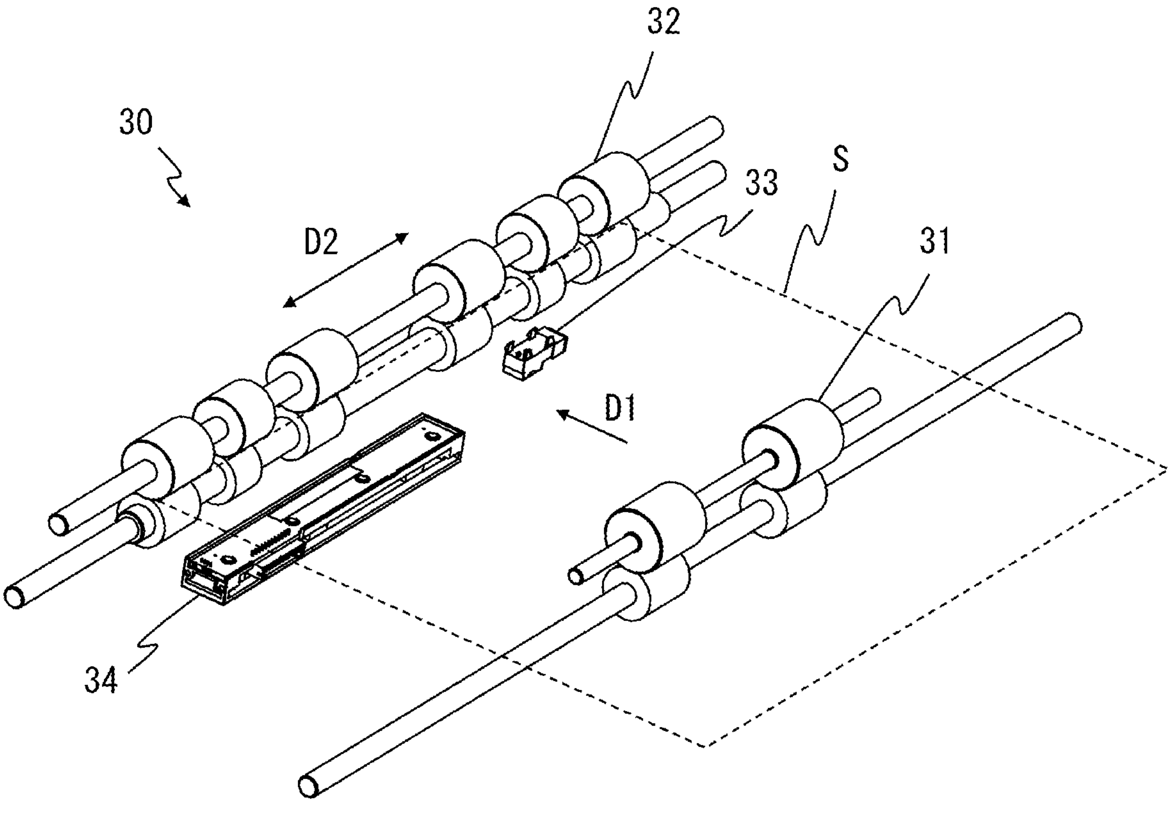
FIG. 2 is a perspective view showing a registration portion according to the first embodiment.

The configuration of the registration portion, which is the first correcting portion of the present embodiment, will be explained in detail below. The registration portion 30 shown in FIG. 2 has a registration roller pair 32, a pre-registration roller pair 31, a registration sensor 33, and a CIS 34. The registration roller pair 32 is the first roller pair of the present embodiment.

The registration roller pair 32 is rotated by the drive power transmitted from the registration motor 42 (FIG. 8) through the transmission gear, and feeds the sheet S to the sheet feeding direction D1. The preregistration roller pair 31 is rotated by the drive power transmitted from the preregistration motor 41 (FIG. 8) through the transmission gear, and feeds the sheet S to the registration roller pair 32 in the sheet feeding direction D1. The registration roller pair 32 is supported by the frame of the printer to move in the widthwise direction D2, and is reciprocated in the widthwise direction D2 by the drive power transmitted from the shift motor 44 (FIG. 8) through the transmission gear. Therefore, the registration roller pair 32 nips and feeds the sheet S to the sheet feeding direction D1, and also moves the sheet S to the widthwise direction D2.

At the upstream side of the registration roller pair 32 in the sheet feeding direction D1, a CIS 34 is arranged as a detecting means (first detecting means) to detect the side edge position of the sheet S. The CIS 34 has CMOS as a photosensitive element arrayed widthwise direction D2 on a substrate, LEDs and light guides for irradiating light toward the sheet S, and an equal magnification lens that images the reflected light from the sheet S onto the photosensitive surface of the CMOS. The control portion 200 (FIG. 8) of the printer 1, which will be described later, can determine the position of the side edge of the sheet S in the registration portion 30 by detecting the side edge of the sheet S from the image data acquired by the CIS 34.

To correct the sheet position in the widthwise direction D2, it is sufficient to detect the position of at least one side edge of the sheet S. Therefore, the CIS 34 is placed at a position that is biased to either side of the center position of the sheet feeding path in the widthwise direction D2. The CIS 34 is configured to have a detection range that can detect both the sheet with the smallest sheet length (sheet width) in the widthwise direction D2 and the side edge of the sheet with the largest sheet width among the sheet sizes that are allowed to be used in the printer 1.

In order to improve the accuracy of the position correction of widthwise direction D2 using the CIS 34, it is preferable to place the CIS 34 near the registration roller pair 32. In addition, the feeding gap (width of the feeding path in the sheet thickness direction perpendicular to the sheet feeding direction D1 and widthwise direction D2) at the detection position of CIS 34 should be adjusted to be uniform. Moreover, a transport gap wider than the detection position of CIS 34 is provided between CIS 34 and the preregistration roller pair 31 in the sheet feeding direction D1. This is to secure a space that allows the sheet S to be flexed (bent) by placing the tip of the sheet against the nip portion of the registration roller pair 32 in order to correct the oblique movement of the sheet S.

[Print Job]

Figure 3:
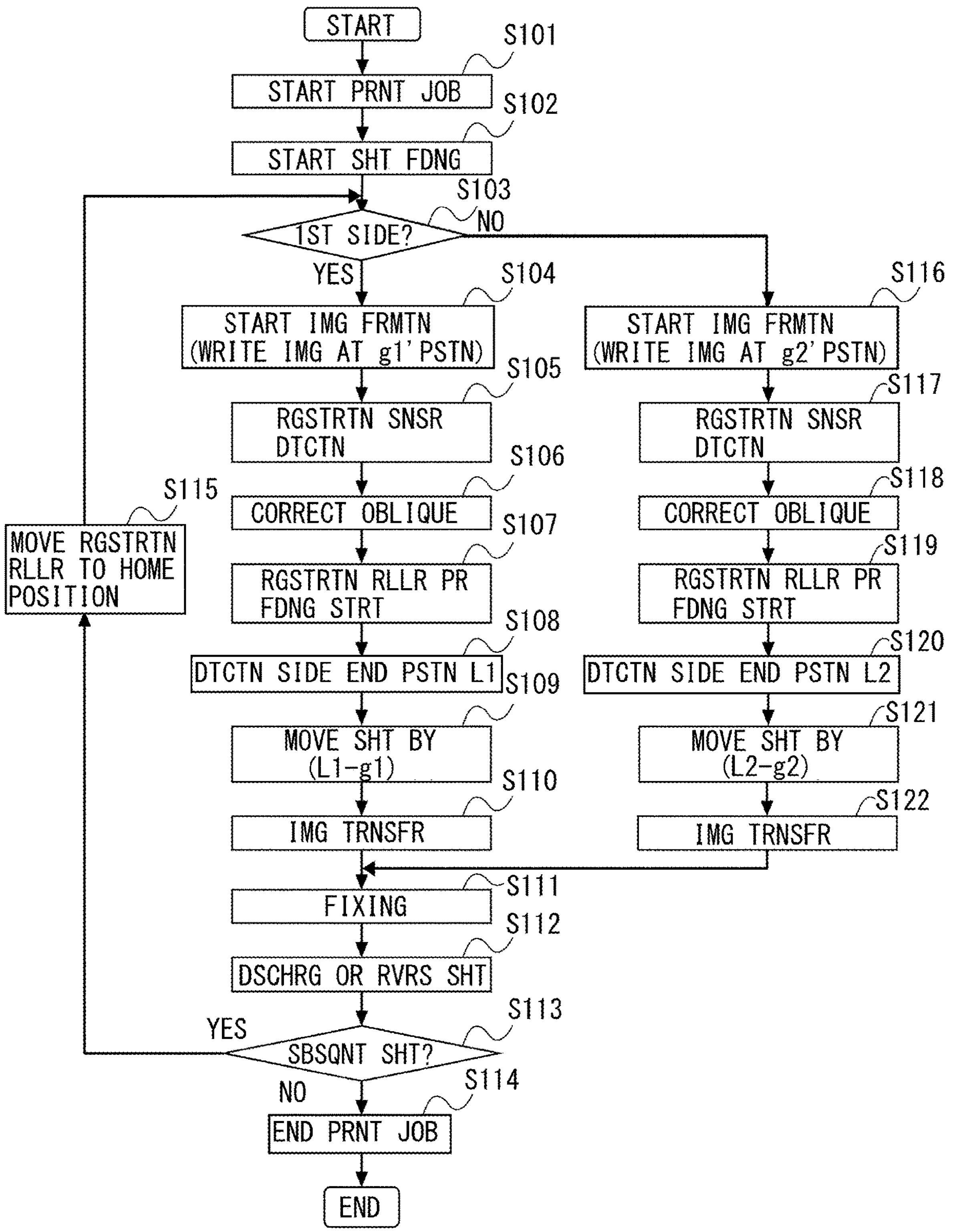
FIG. 3 is a flowchart showing the process of a print job according to the first embodiment.

FIG. 3 is a flowchart showing the procedure of a print job in printer 1. FIG. 4A to FIG. 4E illustrate the oblique movement correction of the sheet S and the position correction of the widthwise direction D2 in the registration portion 30. A print job (also called an image forming job) refers to a series of processes for executing and discharging image forming operations on each sheet S, while having the specified number of sheets S fed one by one, when there is an instruction from the user to execute printing. The print job includes the registration process, which causes the registration portion 30 to perform oblique movement correction of the sheet S and position correction of the widthwise direction D2.

The flow of the print job is described below, referring to the operation diagrams in FIG. 4A through FIG. 4E and the block diagram in FIG. 8, along with the flowchart in FIG. 3. Each process of the print job described below is realized by the CPU 201 of the control portion 200 (FIG. 8) executing the control program and issuing instructions to each module of the control portion 200 as necessary.

First, a print job is started when the control portion 200 accepts a print execution instruction from the user via the computer 204 (S101). The user can specify the number of copies of the print deliverables to be output to the printer 1, the type of sheet to be used for image formation, etc., through the setting screen of the driver software installed in the computer 204 or the screen operation of the operation portion 203. When the print job is started, feeding of the sheet S is started (S102). Next, it is determined whether or not the current image formation is an image formation on the first side of the sheet S or not (S103).

If it is determined that the image formation is for the first side of the sheet (S103: Yes), the image forming control portion 205 causes the exposure device 93 to execute the exposure process so that the electrostatic latent image is written at a pre-determined image writing position g1' on the first surface (S104). The image writing position g1' is the position that is the reference for the widthwise direction D2 of the image formed by the image forming portion 90, and specifically refers to the starting position for writing the electrostatic latent image in the main scanning direction on the photosensitive drum 91 in the exposure process.

In parallel with the exposure process, the sheet S is fed to the registration portion 30. The sheet S is then corrected for oblique movement and the position of the widthwise direction D2 in the following series of processes (registration process) from S105 to S108. First, the registration sensor 33 detects the leading edge of the sheet S (the downstream edge of sheet feeding direction D1) (S105, FIG. 4A). The sensor control portion 207 notifies the CPU 201 that the tip of the sheet S has passed the detection position of the registration sensor 33.

Figure 4A:
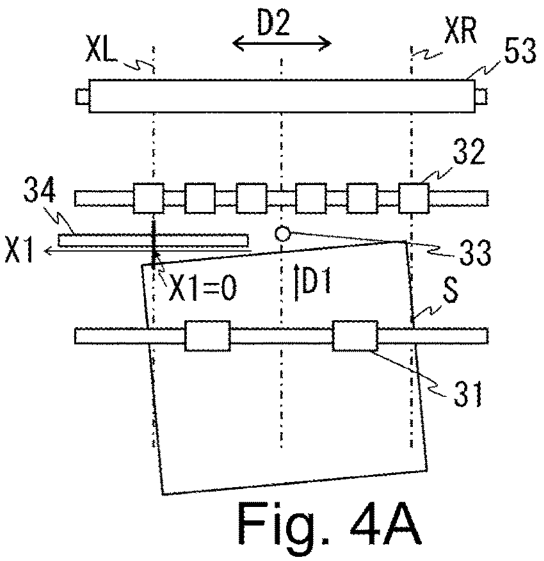
FIG. 4A, FIG. 4B, FIG. 4C, FIG. 4D and FIG. 4E are drawings explaining the motion of a registration portion according to the first embodiment.
Figure 4D:
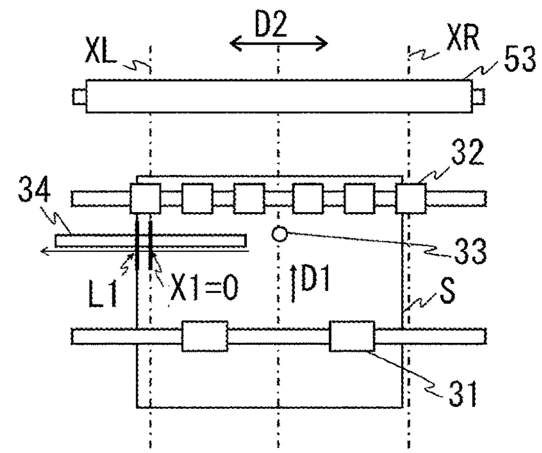

Here, there may be an oblique movement and position shift in the sheet S at the time the sheet S reaches the registration portion 30. A skewed sheet S means that the leading edge of the sheet S is inclined to the widthwise direction D2, and one corner of the leading edge is ahead of the other corner in the sheet feeding direction D1. The position shift of the sheet S means that the center position of the sheet S is shifted from the center position of the widthwise direction D2 of the feeding passage to either side of the widthwise direction D2. Here, as shown in FIG. 4A, we will take the case where the sheet S is in an oblique state, rotated leftward relative to its proper position and orientation when viewed from above. The dashed lines XL and XR in FIG. 4A through FIG. 4E are the side edge positions of the sheet S that has been fed without skewing or position shift, i.e., the side edge positions when the position and orientation of the sheet S are correct.

Figure 4B:
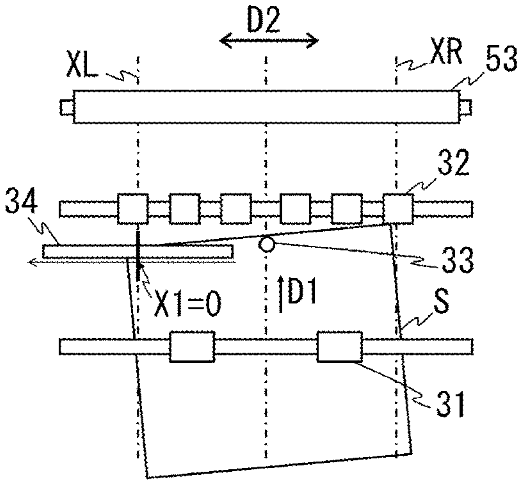

The sheet feeding control portion 206 executes the oblique movement correction of the tip abutting method by the preregistration roller pair 31 and the registration roller pair 32 based on the detection result of the registration sensor 33 (S106). That is, with the registration roller pair 32 stopped, the sheet S is fed by the pre-registration roller pair 31, and the tip of the sheet S is pushed against the nip portion of the registration roller pair 32 (FIG. 4B). The pre-registration roller pair 31 stops after the sheet S is further fed by a predetermined feeding amount from the point of tip contact. This causes the sheet S to bend (loop) between the preregistration roller pair 31 and the registration roller pair 32. In parallel, the tip of the sheet S is turned (arrow B) so that it follows the nip portion of the registration roller pair 32, and the oblique movement of the sheet S is corrected (FIG. 4C). Thereafter, the sheet feeding control portion 206 causes the registration roller pair 32 to start feeding the sheet S at a timing synchronized with the progress of the image forming process in the image forming portion 90 (S107, FIG. 4D).

The shift control portion 208 performs position correction of the widthwise direction D2 for the sheet S after oblique movement correction (S108, S109). Specifically, at the timing immediately after the oblique movement correction, the side edge position of the sheet S is detected by the CIS 34 (S108, FIG. 4D). Here, the position of the sheet S in the widthwise direction D2 is represented by the X1 coordinate of the side edge of the sheet S that is detected by the CIS34 and the position of the side edge of the sheet S detected by the CIS34 is defined as L1. In other words, the widthwise direction position of the sheet S detected by the CIS34 is represented by X1=L1. The coordinate axis (X1 axis) is parallel to the widthwise direction D2, and the origin (X1=0) is the point on the dashed line XL described above. The left side of the figure is the positive direction of X1 with respect to the origin, and the right side of the figure is the negative direction of X1 with respect to the origin.

Figure 4E:
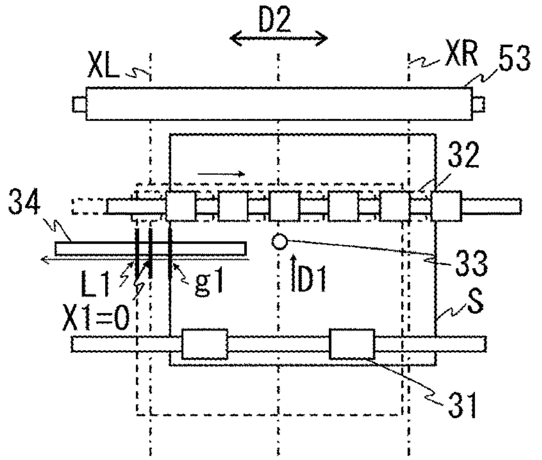
Figure 4C:
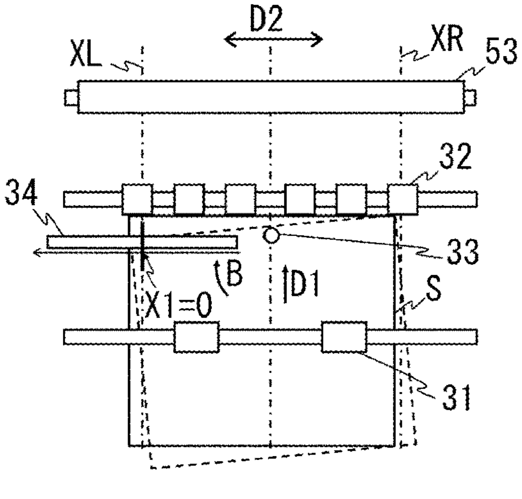

The shift control portion 208 calculates the correction amount of the sheet position based on the side edge position L1 of the sheet S detected by the CIS 34 and the registration roller pair 32 is moved in the widthwise direction D2 by the calculated correction amount (FIG. 4E). In this case, the sheet position correction amount can be obtained by subtracting g1, which represents the target position for position correction in the registration portion 30, from the side edge position L1 of the sheet S detected by the CIS 34 (L1−g1). The target position g1 is the position of the side edge of the sheet S corresponding to the above-mentioned image writing position g1' (S104). In other words, when the image written at the image writing position g1' by the exposure device 93 and developed as a toner image is transferred to the sheet S whose side edge is corrected to the target position g1, the image position of widthwise direction D2 on the sheet becomes appropriate. The target position g1 is stored in a non-volatile storage area of the memory 202, as described below using FIG. 10, as a value set based on the results of image position adjustment performed in advance before the printer 1 is put into use (e.g., before shipment from the factory).

After that, the sheet S is further continued to be fed by the registration roller pair 32, and the image is transferred to the sheet S from the intermediary transfer belt 50 in the secondary transfer portion T2 (S110). At this time, the oblique movement and position shift of the sheet S are corrected in the registration portion 30, so that the image is transferred to the sheet S at an appropriate position. The sheet S from the secondary transfer portion T2 is passed to the fixing unit 100, and the image is fixed (S111).

If the print job settings specify image formation on only one side of the sheet S, the sheet S is discharged outside of the printer 1 via the branch feeding unit 120 or passed to a discharge option device connected to the printer 1 (S112). On the other hand, if double-sided printing is specified in the print job settings, the sheet S is reversed for image formation on the second side (S112). The details of the reversing process are described later.

After the sheet is discharged or reversed, it is determined whether or not there is a subsequent sheet (including the sheet on which the image on the second side is to be formed) to be formed (S113). If it is determined that there is no subsequent sheet (S113: No), the print job is concluded (S114). If it is determined that there is a subsequent sheet (S113: Yes), the shift control portion 208 returns the registration roller pair 32 to the home position (S115). As a result, the registration roller pair 32 moves from the position after the shift shown in FIG. 4E to the home position shown in FIG. 4A (the position where the center position of the registration roller pair 32 coincides with the center position of the feeding path). Then, the process is continued by returning to step S103.

If it is determined in S103 that the image is formed on the second side (S103: No), the sheet that has been reversed in the reversing process (S112) is fed to the registration portion 30 again by the second double-side feeding portion 150 and the first double-side feeding portion 70. The image forming control unit 205 causes the exposure device 93 to execute the exposure process according to the image writing position g2' of the second side that has been determined in advance (S116). The image writing positions g1' and g2' of the first and second sides may be the same or different positions.

Then, through the registration process of S117 to S121, the registration portion 30 corrects the oblique movement of the sheet S and the position of the widthwise direction D2. The contents of the registration process are virtually identical to those of S105 to S109 of the first side, except that the side edge position L2 of the sheet S is detected again by the CIS34 and the target position g2 corresponding to the image writing position g2' of the second side is used as the target position for position correction. Therefore, we omit the explanation of the registration process again. The above target position g2 is set so that when the image formed at the image writing position g2' on the second side is transferred to the second side of the sheet S after position correction by the registration portion 30, the image position on the sheet S is appropriate with respect to the widthwise direction D2. The target position g2 is stored in a non-volatile storage area of the memory 202 as a value set based on the results of image position adjustment performed beforehand before the printer 1 is put into use (e.g., before shipment from the factory). The target positions g1 and g2 of the first and second surfaces may be the same or different values.

Then, the image is transferred from the intermediary transfer belt 50 to the second side of the sheet S in the secondary transfer portion T2 (S122), and the image is then fixed in the fixing unit 100 (S111). Then, the sheet S is discharged outside the printer 1 via the branch feeding unit 120, or passed to the discharge option device connected to the printer 1 (S112). The process from this point on (S113 onward) is the same as that for the first side.

By the way, in case of double-sided printing, the sheet S first passes through the secondary transfer portion T2 and the image is transferred to the first side, and then it is fed through the printer 1 to the secondary transfer portion T2 again. During feeding, due to component tolerances or assembly tolerances of each feeding roller pair that feed the sheet S, the sheet S may have a oblique movement or position shift even though the oblique movement and position shift were corrected by the registration portion 30 before the image transfer of the first side. In particular, if the feeding passage from the first time it passes through the secondary transfer portion T2 to the next time it reaches the secondary transfer portion T2 is long, the skewing and position shift that occur in the feeding passage are likely to be large.

When the position shift of the sheet S that reaches the registration portion 30 again after image formation on the first side is large, the shift amount of the registration roller pair 32 in the position correction (L2−g2 of S121 in FIG. 3) is large. However, if the shift amount of the registration roller pair 32 is large, the movement amount of the sheet S widthwise direction D2 may be smaller than expected, or the sheet S may be skewed or wrinkled.

One reason for this is that the sheet S receives resistance by sliding against the feeding guide when it moves in widthwise direction D2. In addition, when the size of the sheet S is large, the sheet S is nipped by a roller pair other than the registration roller pair 32, which makes it easier for the sheet to receive resistance in moving widthwise direction D2. It is conceivable that the pre-registration roller pair 31 can be separated after the registration roller pair 32 starts feeding to reduce the resistance during the shift motion. Even in this case, if the sheet feeding direction length of the sheet S is large (for example, if the sheet is longer than the A3 length), the roller pair further upstream of the pre-registration roller pair 31 may cause resistance during the shift motion. Examples of roller pairs further upstream of the pre-registration roller pair 31 are the drawing roller pair 21*a* shown in FIG. 1 and the most downstream roller pair 71 of the first double-side feeding portion 70.

If the shift amount of the registration roller pair 32 located immediately before the secondary transfer portion T2 is large, the accuracy of the position correction of the sheet S may be reduced, or skewing or wrinkling of the sheet S may occur and the quality of the image transferred to the sheet S in the secondary transfer portion T2 may be reduced. In addition, if the shift amount of the registration roller pair 32 is large, the time required for the shift motion and the time required to return the registration roller pair 32 to the home position after the shift motion will become longer. As a result, the interval between sheets passing through the secondary transfer portion T2 (paper spacing) becomes longer, and the productivity of the printer 1 may decrease. Therefore, the present embodiment is configured to correct the position of the sheet S widthwise direction D2 even in the reverse feeding portion 130.

[Reverse Feeding Portion]

Figure 5:
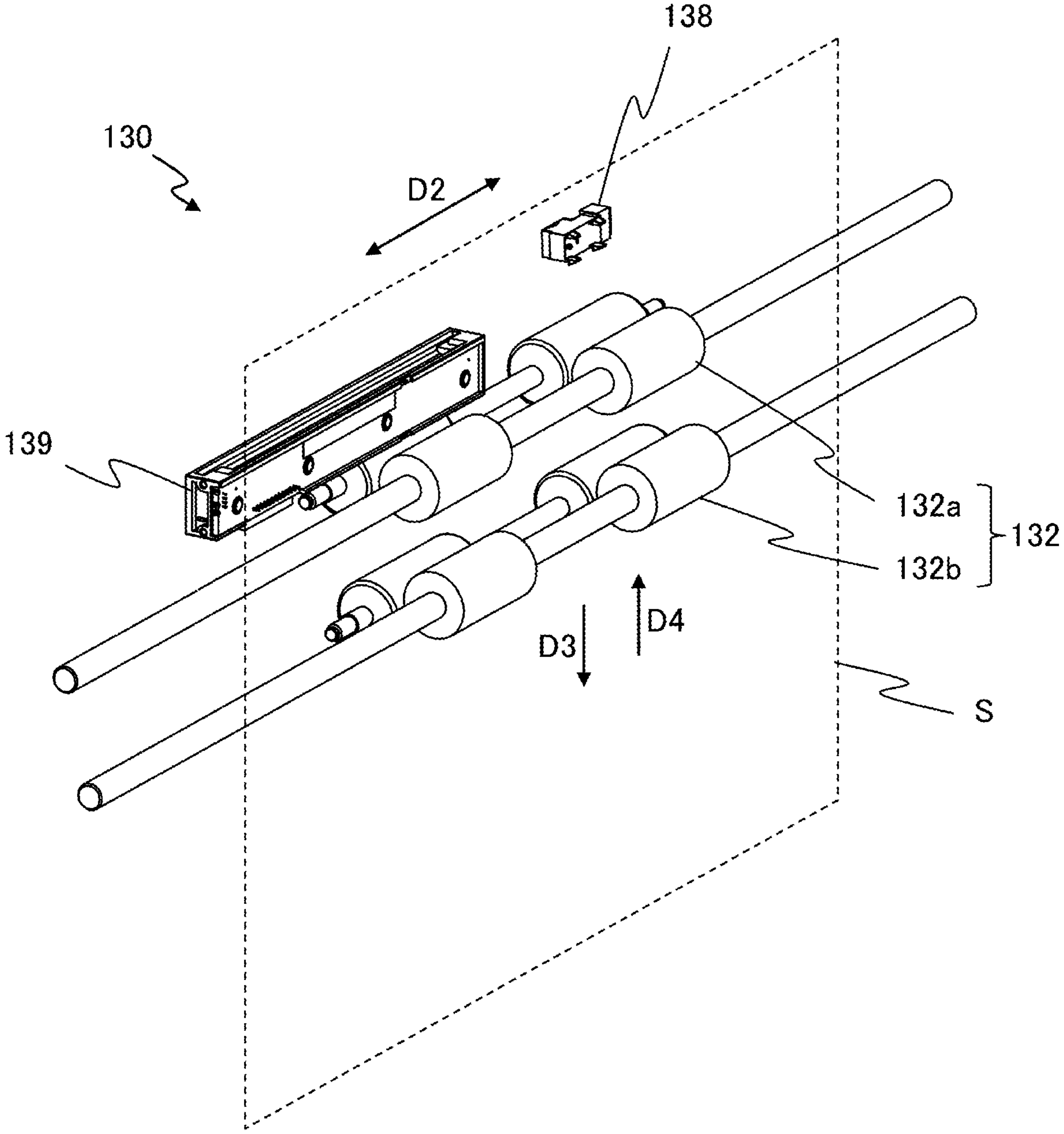
FIG. 5 is a perspective view showing a reverse feeding portion according to the first embodiment.

Next, a structure of the reverse feeding unit 130 will be described. FIG. 5 is a perspective view showing a reverse feeding portion 130. The reverse feeding portion 130 includes a feeding roller pair 131 (FIG. 1), a switching member 143, a reverse sensor 138, a CIS 139, a first reversing roller pair 132*a* and a second reversing roller pair 132*b*. The first reversing roller pair 132*a* and the second reversing roller pair 132*b* constitute a reverse shift unit 132 capable of moving (shifting) the sheet S in the widthwise direction D2 while reversing and feeding it. The reverse feeding portion 130 is the second correcting portion of the present embodiment, and the first reversing roller pair 132*a* is the second roller pair of the present embodiment that nips and feeds the sheet and is movable in widthwise direction D2. The second reversing roller pair 132*b* is the third roller pair of the present embodiment that can move in the widthwise direction D2 while nipping and feeding the sheet with the second roller pair.

The first reversing roller pair 132*a* and the second reversing roller pair 132*b* are rotated by the drive power transmitted from the reversing motor 43 (FIG. 8) through the transmission gear, and feed the sheet S in the forward direction D3 and the reverse direction D4. The first reversing roller pair 132*a* and the second reversing roller pair 132*b* are supported by the frame of the printer 1 so that they can move in the widthwise direction D2, and move back and forth in the widthwise direction D2 by the driving force transmitted from the shift motor 45 (FIG. 8) through the transmission gear. Therefore, the reverse shift unit 132 is capable of nipping the sheet S, transporting it in the forward direction D3 and the reverse direction D4, and moving the sheet S in the widthwise direction D2.

On the upstream side of the reversing shift unit 132 in the forward direction D3, a CIS 139 is arranged as a detecting means (second detecting means) to detect the side edge position of the sheet S. The CIS 139 includes a CMOS as a light receiving element arranged in widthwise direction D2 on a substrate, LEDs and light guides for irradiating light toward the sheet S, and an equal magnification lens that images the reflected light from the sheet S onto the light receiving surface of the CMOS. By detecting the side edge of the sheet S from the image data acquired by the CIS 139, the control portion 200 (FIG. 8) of the printer 1 can obtain the position of the side edge of the sheet S in the reversing shift unit 132.

The CIS 139 is located at a position that is biased to either side relative to the center position of the sheet feeding path in widthwise direction D2. The CIS 139 is configured to have a detection range that can detect both the sheet with the smallest sheet length (sheet width) in widthwise direction D2 and the sheet with the largest sheet width among the sheet sizes that are allowed to be used in printer 1.

The reverse sensor 138 detects the sheet S at the upstream side of the reverse shift unit 132 in the forward feeding direction D3. The feeding roller pair 131 (FIG. 1) feeds the sheet S received from the branch feeding unit 120 toward the reverse shift unit 132. The switching member 143 (FIG. 1) switches the feeding passage of the sheet S, whose feeding direction has been reversed by the reversing shift unit 132, between the second double-side feeding portion 150 and the branch feeding unit 120. A reversing guide 142 (FIG. 1) as a guiding member is provided downstream of the reversing shift unit 132 in the forward feeding direction D3 to guide the first side of the sheet S. The reverse guide 142 forms a space to temporarily evacuate a portion of the sheet on the forward direction D3 side of the sheet to be reversed and fed by the reverse shift unit 132.

[Reverse Shift Process]

Figure 6:
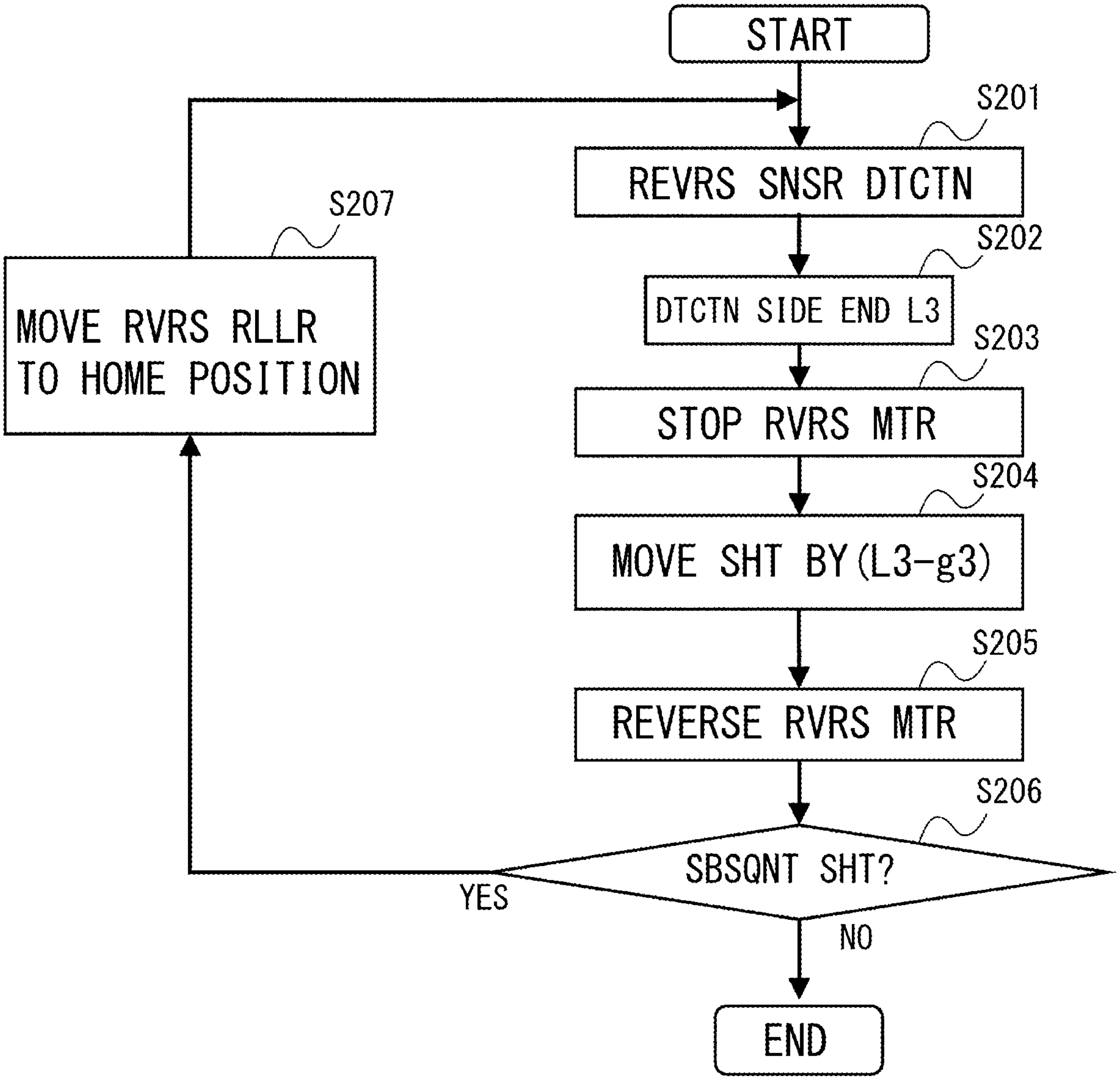
FIG. 6 is a flowchart showing the reverse shifting procedure according to the first embodiment.
Figure 7A:
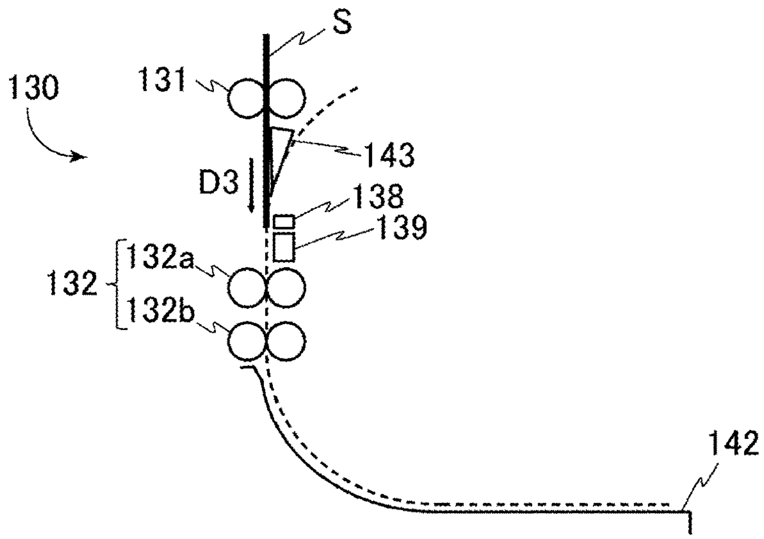
FIG. 7A, FIG. 7B and FIG. 7C are drawings showing the motion of the reverse feeding portion according to the first embodiment.
Figure 7B:
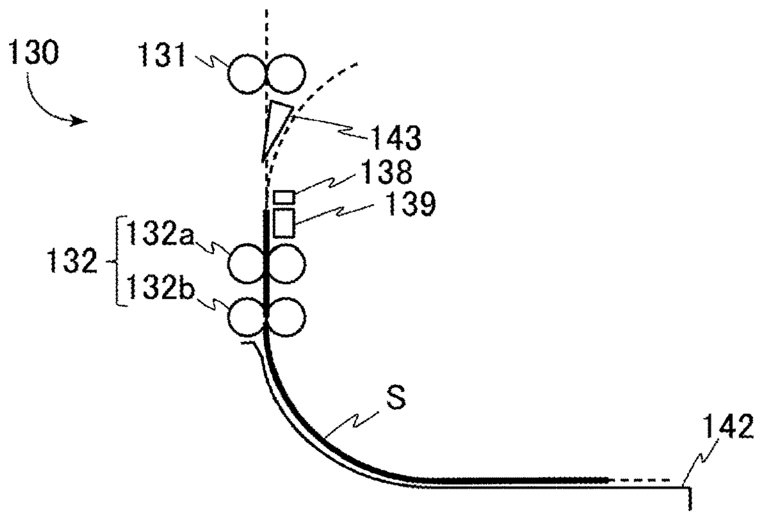
Figure 7C:
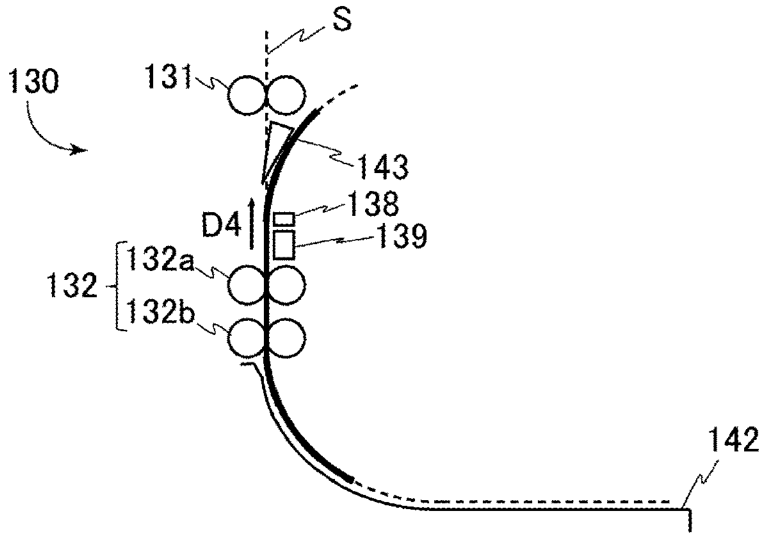

Next, we will explain the series of processing (reverse shift process) that performs the reverse feeding of the sheet S and the position correction of the widthwise direction D2 in the reverse feeding portion 130. FIG. 6 is a flowchart showing the processing procedure of the reverse shift process in printer 1. FIG. 7A to FIG. 7C are schematic cross-sectional views to explain the switchback operation in the reverse feeding portion 130.

The flowchart in FIG. 6 is executed in parallel with the processing of the print job shown in FIG. 3. Each process of the print job is realized by the CPU 201 of the control portion 200 (FIG. 8) executing the control program and issuing instructions to each module of the control portion 200 as necessary.

As mentioned above, when double-sided printing is specified in the print job settings, the sheet S with the image formed on the first side is sent by the branch feeding unit 120 to the reverse feeding portion 130 (FIG. 3 S112). The switching member 143 is urged to the left in FIG. 7A by an urging member, and the sheet S is fed by the feeding roller pair 131 while pressing the switching member 143 (FIG. 7A).

Subsequently, the sheet S is detected by the reverse sensor 138 (S201). The sensor control unit 207 notifies the CPU 201 that the tip of the sheet S has passed the detection position of the reverse sensor 138. In addition, the side end position of the sheet S is detected by the CIS 139 (S202). The detection position of the side end of the sheet S by the CIS 139 is set to L3.

Subsequently, based on the detection result of the reverse sensor 138, when the rear end of the sheet S has passed through the switching member 143 and has advanced a predetermined distance, the sheet feeding control portion 206 stops driving the reversing motor 43 (FIG. 8) to temporarily stop the sheet S (S203, FIG. 7B). The shift control portion 208 corrects the position of the sheet S in the widthwise direction D2 by driving the shift motor 45 after the sheet S is stopped to move the first reversing roller pair 132*a* and the second reversing roller pair 132*b* in the widthwise direction D2 (S204). The method of setting the target position g3 in this position correction is described later. In parallel with the position correction, the sheet feeding control portion 206 executes a reverse feeding operation to feed the sheet S in the reverse feed direction D4 by reversing the reversing motor 43 (S205, FIG. 7C). Either the position correction of S204 or the reverse feed operation of S205 may be started first.

Subsequently, it is determined whether or not there is a subsequent sheet that is sent to the reverse feeding portion 130 (S206). If it is determined that there is no subsequent sheet (S206: No), the reverse shift process ends. When it is determined that there is a subsequent sheet (S206: Yes), the shift control portion 208 returns the first reversing roller pair 132*a* and the second reversing roller pair 132*b* to the home position (S207). This causes the first reversing roller pair 132*a* and the second reversing roller pair 132*b* to move from the position after the shift movement to the home position (the position where the center position of the first reversing roller pair 132*a* and the second reversing roller pair 132*b* coincides with the center position of the feeding path). Thereafter, the process is continued by returning to step S201.

As described above, in the present embodiment, when double-sided printing is performed, the sheet S with the image formed on the first side is corrected for position in the widthwise direction D2 at the reverse feeding portion 130. This corrects the position shift of the sheet S that occurs between the time the position is corrected in the registration portion 30 before image transfer to the first side and the time the sheet S reaches the reverse feeding portion 130. Therefore, by correcting the position of the sheet S also in the reverse feeding portion 130, the position shift amount corrected by the registration portion 30 before transferring the image to the second side becomes smaller than when correcting the position shift of the sheet S only in the registration portion 30.

In the reverse feeding portion 130, the sheet S is not nipped by any roller pair other than the first reversing roller pair 132*a* and the second reversing roller pair 132*b* during the shift motion. Therefore, even when the sheet S has a long length in the sheet feeding direction, the resistance of the shift motion does not increase due to being nipped by other roller pairs, and the shift motion can be performed smoothly.

Furthermore, the reverse guide 142, which guides the sheet S at the downstream side of the reverse shift unit 132 in the forward direction D3, is provided only on one side (first side) of the sheet S, and no other guiding member facing the second side of the sheet S is provided. The reverse guide 142 forms a space that accommodates the sheet S protruding from the reverse shift unit 132 in a curved position when viewed in widthwise direction D2. The sheet S is accommodated in the above space with one of its sides (here the first side) guided by the reverse guide 142 and convexly curved toward the reverse guide 142, and the other side (the second side) concavely curved facing the space. Therefore, compared to the registration portion 30, which has a feeding guide facing both sides of the sheet S, the resistance that the sheet S receives by rubbing against the transport guide during the shift motion is smaller, and it is easier to move the sheet S in the widthwise direction D2.

In addition, the reverse shift unit 132 of the present embodiment is configured to shift two roller pairs (second roller pair and third roller pair) of the first reversing roller pair 132*a* and the second reversing roller pair 132*b* simultaneously. By performing the shift motion with the sheet S nipped between the two sets of rollers, the sheet S slips against the roller pair during the shift motion, reducing the possibility of skewing, and making it possible to perform a more stable shift motion.

The printer 1 of the present embodiment is divided into the first casing 1*a* and the second casing 1*b*, which are connected to each other. The registration portion 30 and the reverse feeding portion 130, which perform the position correction of the widthwise direction D2, are located in the first casing 1*a* and the second casing 1*b*, respectively. Since the sheet S is passed to the other casing after the position of the widthwise direction D2 is corrected in each casing, the position shift of the widthwise direction D2 of the sheet S is suppressed when the sheet S is passed between casings. Therefore, there is no need to make the guiding members that form the openings of each casing where the sheets S are passed on excessively large in widthwise direction D2, which can reduce costs and save space.

[Details of Sheet Position Correction Control]

The control of sheet position correction for widthwise direction D2 (lateral registration shift control) by the registration portion 30 and the reverse feeding portion 130 is explained in more detail.

In the present embodiment, the position correction of the sheet S widthwise direction D2 is performed two or more times for one sheet S. In this case, it is desirable to make the shift amount for position correction in the registration portion 30 near the transfer portion of the image smaller than the shift amount for position correction further upstream (in this case, the reverse feeding portion 130). If the shift amount in the registration portion 30 becomes large, the movement amount of the sheet becomes smaller than the shift amount, as described above, and the accuracy of position correction may decrease, or the sheet may receive resistance from the transport guide, etc., causing skewing or wrinkling. This is because these may affect the quality of the image that is transferred in the secondary transfer portion T2. The reason is that if the shift motion of the registration roller pair 32 and the time required for the return motion become longer due to the large shift amount in the registration portion 30, the paper space in the secondary transfer portion T2 may widen, leading to a decrease in the productivity of the printer 1.

In the present embodiment, the target position of the shift motion in the reverse feeding portion is offset from the predetermined reference position to make the shift amount of the registration roller pair 32 as small as possible. The control related to this is explained in more detail below.

Figure 9A:
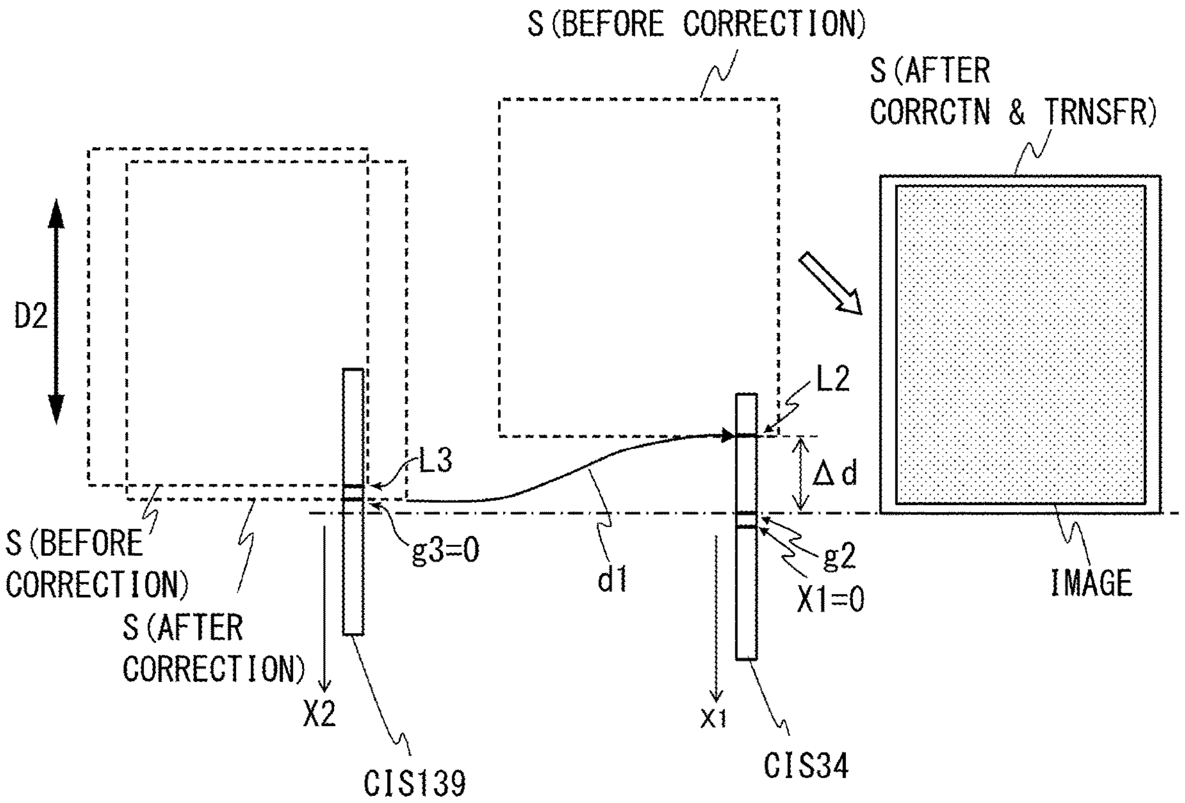
FIG. 9A is a schematic view showing the positioning of the sheets during feeding in the comparison example.
Figure 9B:
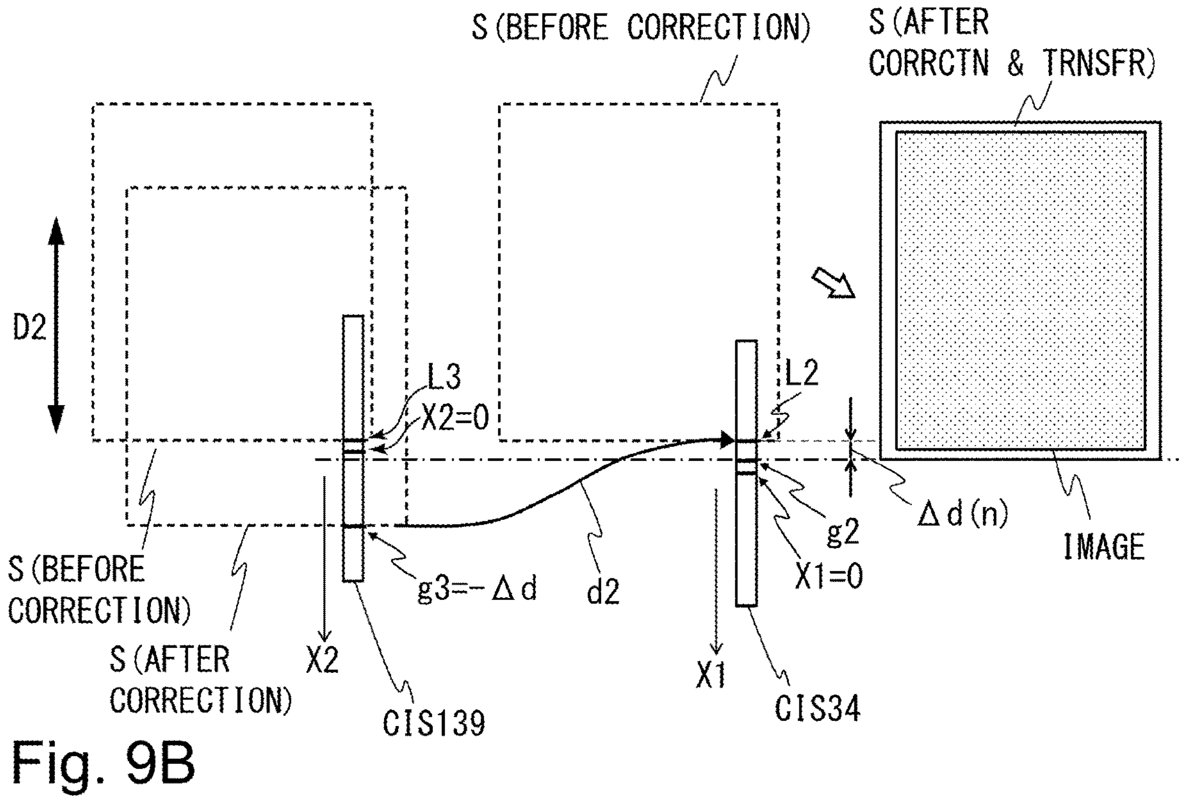
FIG. 9B is a schematic view showing the positioning of the sheets during feeding in the first embodiment.

FIG. 9A and FIG. 9B are schematic views showing the positional relationship of the sheet S being fed from the reverse feeding portion 130 through the registration portion 30 and the secondary transfer portion T2. In the figure, the position of the sheet S in the widthwise direction D2 in the reverse feeding portion 130 is represented by the X2 coordinate, and the position of the side edge of the sheet S detected by the CIS 139 is L3. That is, the widthwise direction position of the sheet S detected by the CIS 139 is represented by X2=L3. The coordinate axis (X2 axis) is parallel to the widthwise direction D2, and the origin (X2=0) is the positive direction of X2 in the lower part of the figure relative to the origin, and the negative direction of X2 in the upper part of the figure relative to the origin. Similarly, the position of the sheet S in widthwise direction D2 in registration portion 30 shall be represented by X1 coordinates, and the side edge position of the sheet S detected by CIS 34 shall be L2.

As a comparison example, FIG. 9A shows the case where the target position g3 for position correction in the reverse feeding portion 130 is set to the nominal side edge position (X2=0) of the sheet S in the CIS 139 as an example of a predetermined reference position. The target position g2 for position correction in the registration portion 30 is the position corresponding to the image writing position g2' (S116 in FIG. 3) on the second surface in an image forming portion 90.

The side edge position L3 of the sheet S detected by the CIS 139 is usually deviated from the nominal side edge position (X2=0) due to the position shift of the sheet S widthwise direction D2 that occurred before reaching the CIS 139. In this comparative example, it is assumed that the side edge position of the sheet S is corrected to the target position, g3=0, by the shift motion in the reverse feeding portion 130.

After that, a position shift of the sheet S widthwise direction D2 occurs while it is being fed from the reverse feeding portion 130 toward the registration portion 30. The curve d1 in FIG. 9A shows that the side edge of the sheet S, which was corrected to the nominal position (X2=0) in the reverse feeding portion 130, has shifted position to the position X1=L2 when it reaches the CIS 34 in the registration portion 30. Although there are various factors that cause position shift of the widthwise direction D2 when a sheet S is being fed, in general, the longer the feeding passage of the sheet S, the larger the position shift of the widthwise direction D2 is likely to be due to the accumulated effects of component tolerances and assembly tolerances of the rollers and feeding guides involved in feeding the sheet S. Therefore, the position of the side edge of the sheet S detected by the CIS 34 of the registration portion 30 may have shifted position by a relatively large distance relative to the target position g2 of the side edge of the sheet in the position correction of the registration portion 30.

When position correction is performed in the reverse feeding portion 130 with the target position g3 being the nominal side end position (X2=0), the difference between the side end position L2 of the sheet S detected by the CIS 34 in the registration portion 30 and the target position g2 for position correction in the registration portion 30 is the position shift amount Δd. In the comparative example, the position shift amount Δd may be relatively large as described above, but even in that case, position correction is performed to eliminate the position shift amount Δd in registration portion 30 in order to transfer the image to the proper position in secondary transfer portion T2. Consequently, the shift amount of the registration roller pair 32 becomes larger, which may lead to the decrease in image quality and productivity described above.

In contrast, in the configuration of the present embodiment shown in FIG. 9B, the target position g3 of the position correction in the reverse feeding portion 130 is offset from the reference position (g3=−Δd) toward the opposite side of the position shift amount Δd described above. In this case, the side edge of the sheet S that has been corrected to the target position g3 in the reverse feeding portion 130 is displaced to approach the nominal position (X1=0) of the sheet side edge in the registration portion 30 (curve d2) while being fed to the registration portion 30. This is because the feeding passage from the reverse feeding portion 130 to the registration portion 30 is identical to the case where the target position g3 is not offset, and therefore the position shift of the sheet S that occurs during the conveyance of this path is expected to be equal to or close to Δd. Therefore, by offsetting the target position g3 from the reference position toward the opposite side of the position shift amount Δd in advance, the side edge position L2 of the sheet S when it reaches the registration portion 30 can be brought closer to the target position g2 for position correction in the registration portion 30.

[Acquisition of Target Positions g1 and g2 of a Sheet in the Widthwise Direction]

The method of acquiring the target positions g1, g2, and g3 for position correction of the sheet S in the registration portion 30 and the reverse feeding portion 130 is described below using the flowcharts in FIG. 10 and FIG. 11. Each process in this flowchart is realized by the CPU 201 of control portion 200 (FIG. 8) executing the control program and issuing instructions to each module of control portion 200 as necessary.

Figure 10:
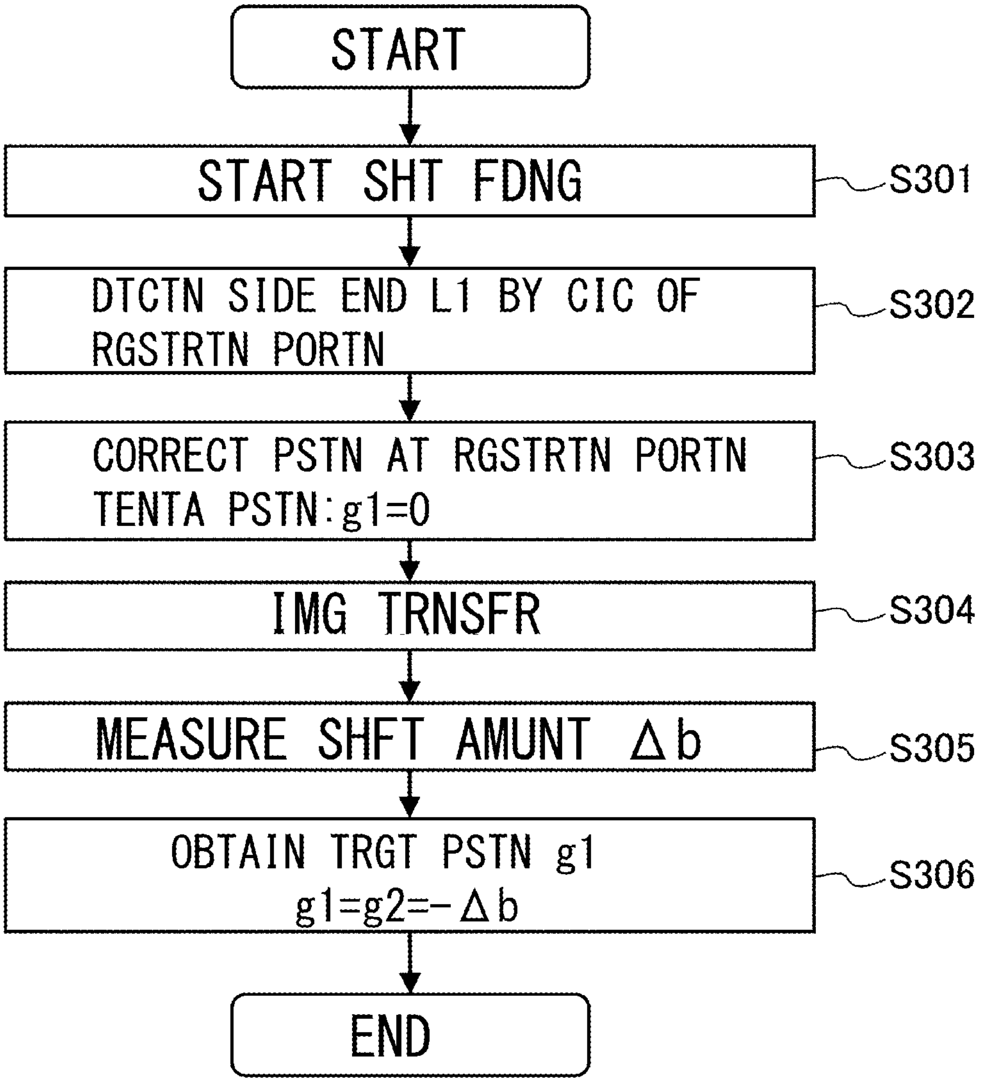
FIG. 10 is a flowchart showing the process of acquiring the target position for position correction in the registration portion according to the first embodiment.

FIG. 10 shows the flow of acquiring the target positions g1 and g2 for position correction in registration portion 30. The process in this flowchart is performed separately from the print job for the user to obtain the print deliverables, as an adjustment process before shipment from the factory, as an initial setup operation when the equipment is installed, or as a maintenance operation performed by the user or service personnel after installation.

First, a sheet S is fed from the feeding units 10*a* and 10*b*, and an image for testing is formed at the image writing position g1' in the image forming portion 90 (S301). Then, after correcting the oblique movement of the sheet S, the side edge position L1 of the sheet S is detected by the CIS 34 of the registration portion 30 (S302). Next, the nominal position of the CIS 34 is set as the tentative target position (g1=0), and the position of the sheet S is corrected (S303). In other words, the shift control portion 208 (FIG. 8) executes the shift motion of the registration roller pair 32 to the preset position (g1=0) based on the detection result of the CIS 34. After that, the sheet S passes through the secondary transfer portion T2, and a test image is formed on the sheet S.

Next, the margin between the side edge of the sheet S and the image on the sheet S is measured, and the amount of deviation from the nominal margin Δb is acquired (S305). The nominal margin refers to the margin when the test image is formed in the center of the sheet S widthwise direction D2. The margin may be measured automatically by an in-line camera installed inside the printer 1, or it may be measured by a worker who measures the sheet S ejected from the printer 1, and the worker inputs the measurement result via the operation portion 203 (FIG. 8).

Then, the shift control portion 208 acquires the target position of the position correction in the registration portion 30 based on the measured deviation of the margin from the nominal value Δb as g1=−Δb (S306). In the present embodiment, for the first and second sides of the sheet S, the image writing positions g1', g2' and the target positions g1, g2 of the position correction in the registration portion 30 are common. Therefore, the shift control portion 208 obtains the target position for the second side of the sheet S as g2=−Δb based on the amount of shift Δb calculated in S305 (S306).

The target position g2 for the second side of the sheet S may be acquired separately from the target position g1 for the first side. In that case, after the test image is formed on the first side, the target position g2 for the second side can be obtained by executing the same process as S302 to S305 for the sheet S that has been reversed by the reverse feeding portion 130.

[Acquisition of a Target Position g3 of a Sheet in Widthwise Direction]

Figure 11:
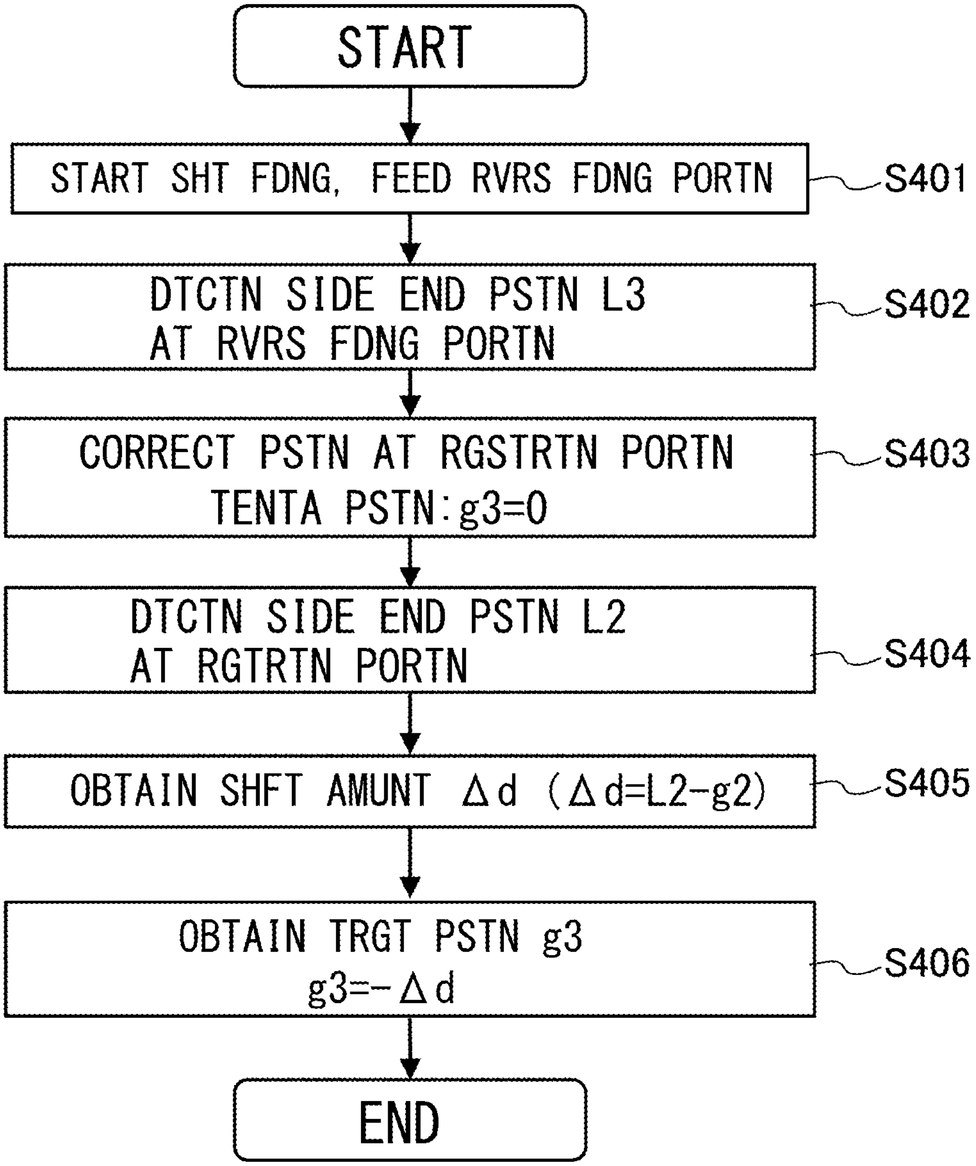
FIG. 11 is a flowchart showing the process of acquiring the target position for position correction in the reverse feeding portion according to the first embodiment.

FIG. 11 shows the acquisition flow of a target position g3 for position correction in the reverse feeding portion 130. The process in this flowchart is performed separately from the print job for the user to obtain the print deliverables, as an adjustment process before shipment from the factory, as an initial setup operation when the equipment is installed, or as a maintenance operation performed by the user or service personnel after installation. In other words, the controller of the present embodiment can run the acquisition process to obtain the offset amount of the target position g3 separately from the job to obtain the printed deliverables. In this flowchart, a measuring sheet that is not intended to form an image is used as the printing deliverable.

First, a sheet S is fed from feeding units 10*a* and 10*b* as a measuring sheet and is fed to the reverse feeding portion 130 (S401). Then, the CIS 139 of the reverse feeding portion 130 detects the side edge position L3 of the sheet S (S402). Next, the nominal position of the CIS 139 is set to a tentative target position (g3=0), and the position of the sheet S is corrected (S403). In other words, the shift control portion 208 (FIG. 8) executes the shift motion of the registration roller pair 32 (see FIG. 9A), targeting the preset position (g3=0) based on the detection results of the CIS 139. The sheet S is then fed to the registration portion 30.

In the registration portion 30, the side edge position L2 of the sheet S is detected by the CIS 34 (S404). The difference between the side edge position L2 of the sheet S detected in the registration portion 30 and the target position g2 obtained in advance according to the acquisition flow in FIG. 10 is acquired as the position shift amount Δd (see FIG. 9A) (S405). Then, the target position for position correction in the reverse feeding portion 130 is set to g3=−Δd (S406). In other words, the shift control portion 208 (FIG. 8) sets the target position g3 for position correction in the reverse feeding portion 130 based on the difference between the side edge position L2 of the sheet S detected in the registration portion 30 and the target position g2 for position correction in the registration portion 30. Put differently, the controller determines the offset amount to offset the second position from the reference position when the job is executed, based on the position shift amount obtained by the acquisition process executed prior to the execution of the job to obtain the printed deliverables. As a result, the target position g3 for position correction in the reverse feeding portion 130 is offset by the position shift amount Δd that occurs during the transfer from the reverse feeding portion 130 to the registration portion 30 (see FIG. 9B).

[Updating the Information of the Target Position g3 of the Sheet in Widthwise Direction]

Furthermore, in the present embodiment, after the above target position g3 has been set, the process of updating the target position g3 is performed during the execution of a print job to output the print deliverable. Specifically, the position shift amount, shown as Δd(n) in FIG. 9B, is monitored during the execution of a print job. Δd(n) is the difference (Δd(n)=L2−g2) between the side edge position L2 of the $n^{th}$ sheet S, which has reached the registration portion 30 after being corrected in the reverse feeding portion 130, and the target position g2 corresponding to the image writing position g2'.

Figure 12:
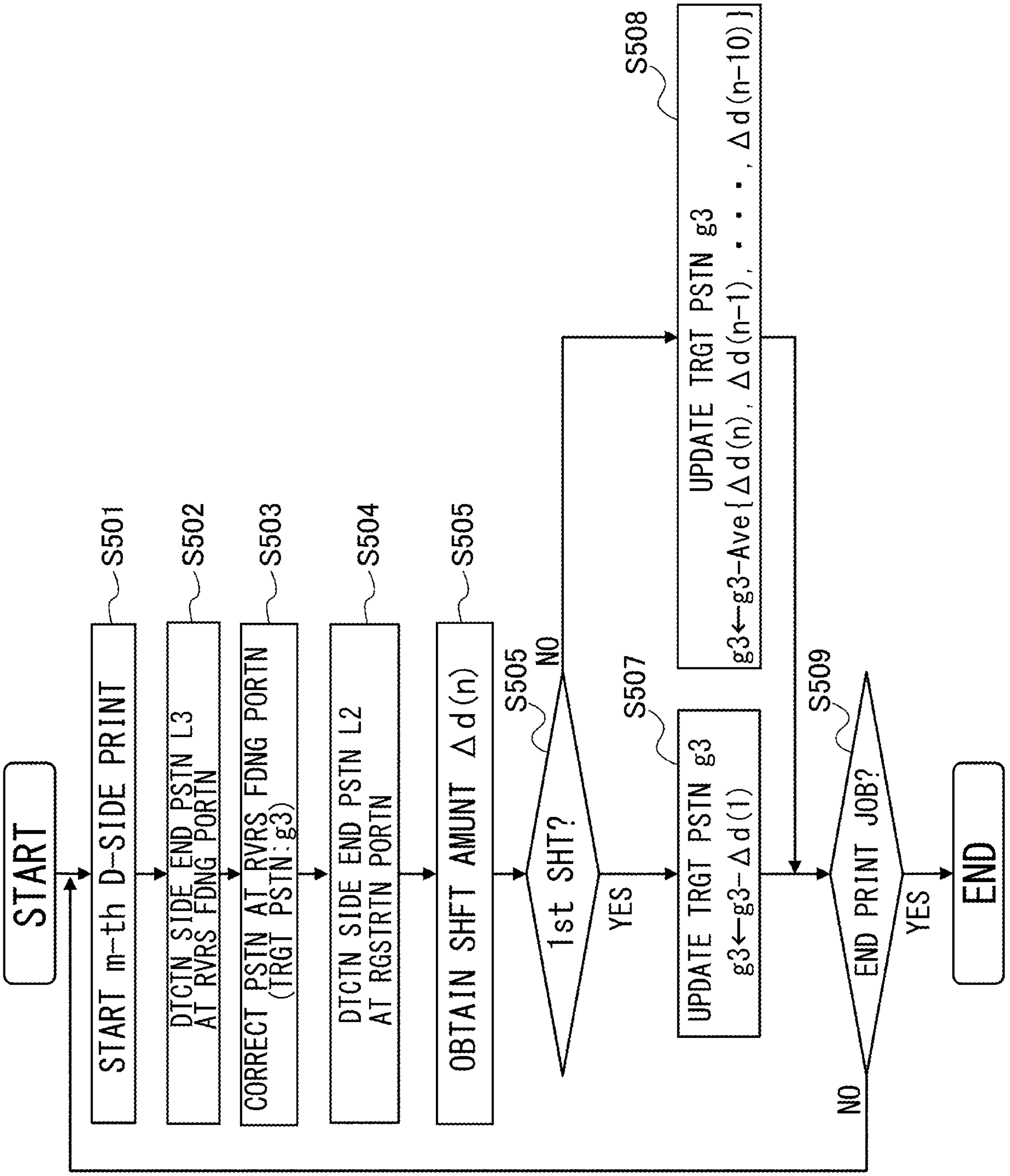
FIG. 12 is a flowchart showing the process of updating the target position for position correction in the reverse feeding portion according to the first embodiment.

FIG. 12 explains the process flow of updating the target position g3 for position correction in the reverse feeding portion 130. Each process in this flowchart is realized by the CPU 201 of the control portion 200 (FIG. 8) executing the control program and issuing instructions to each module of control portion 200 as necessary. This flowchart is executed in parallel with the print job processing (FIG. 3) when a double-sided print job is executed.

First, a sheet S is fed from the feeding units 10*a*, 10*b* (S501), and after image formation on the first side, it is fed to the reverse feeding portion 130. Then, the side edge position L3 of the sheet S is detected by the CIS 139 of the reverse feeding portion 130 (S502), and the position of the sheet S is corrected based on the current value of the target position g3 (S503). In other words, the shift control portion 208 executes the shift motion of the reverse shift unit 132 based on the side edge position L3 detected by the CIS 139 and the current value of the target position g3, and corrects the side edge position of the sheet S to the target position g3

(S503). The shift amount (correction amount of the side edge position) of the reversing shift unit 132 in this shift motion is L3-g3.

When the sheet S whose position has been corrected in the reverse feeding portion 130 is fed to the registration portion 30, the side edge position L2 is detected by the CIS 34 in the registration portion 30 (S504). Then, the difference Δd (n) between the side edge position L2 of the sheet S detected by the CIS 34 and the target position g2 of the position correction in the registration portion 30 corresponding to the image writing position g2' is obtained (S505). In other words, the shift control portion 208 obtains Δd(n) as the position shift amount of the side end position L2 detected by the CIS 34 relative to the target position g2.

If the current sheet S is the first sheet in the print job (S506: Yes), the target position g3 is updated with the value obtained by subtracting Δd(1) from g3 obtained in the flow of FIG. 12 (g3−Δd(1)) (S507). If the current sheet S is the second or later sheet (S506: No), the target position g3 is updated to the value obtained by subtracting the average value of Δd(n) for the predetermined number of preconditioning sheets from the current g3 (S508). For example, to update the target position g3 using the results of the last 10 measurements, the following formula can be used.

$$g3 \leftarrow g3 - Ave\{\Delta d(n), \Delta d(n-1), \ldots, \Delta d(n-10)\}$$

Here, "←" indicates substitution. Ave (x1, x2, . . . , xm) represents the average value of x1, x2, . . . , xm. If the number of values obtained among x1, x2, . . . , xm is less than 10, it shall be the average value among the values obtained. In addition, although g3 is updated here using the results of the last 10 measurements, the results of any number of measurements, two or more, may be used.

The above process (S501 to S508) is repeated for each sheet specified in the print job (S509: No), and when the process for all sheets is completed (S509: Yes), the flow ends.

In this manner, in the present embodiment, the target position g3 applied to the subsequent sheet is updated based on the difference Δd(n) between the side edge position L2 of the preceding sheet and the target position g2 detected by the registration portion 30 during the execution of the print job. In other words, the controller updates the offset amount that offsets the second position from the reference position for a subsequent sheet that follows the preceding sheet in the plurality of sheets based on the position shift amount for the first position of the sheet detected by the first detecting means for the preceding sheet in the plurality of sheets during execution of a job that forms images on the plurality of sheets. This further reduces the position shift of the side edge position L2 of the sheet S that reaches the registration portion 30 after position correction using the updated target position g3 compared to the target position g3 before the update, relative to the target position g2. Therefore, it is possible to further reduce the shift amount of the registration roller pair 32 when performing position correction in the registration portion 30.

Second Embodiment

Figure 13:
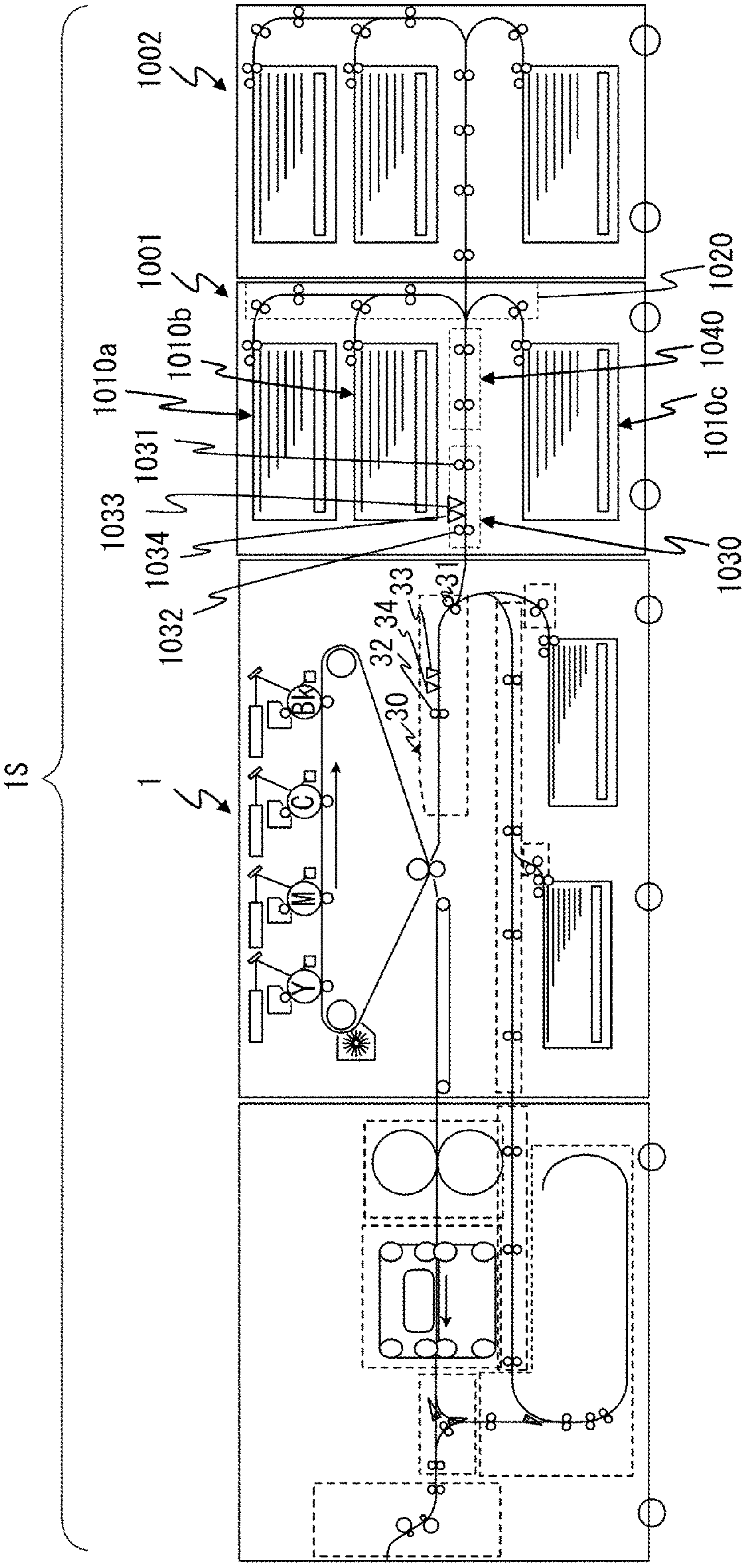
FIG. 13 is a schematic view of an image forming system according to the second embodiment.

The image forming apparatus according to the second embodiment is described in FIG. 13 through FIG. 17. The present embodiment includes a mechanism for correcting the sheet position in widthwise direction D2 in the feeding option devices 1001 and 1002 connected to printer 1 as shown in FIG. 13. In the following, elements with the same symbols as the first embodiment are assumed to have substantially the same configuration and function as the first embodiment, and are omitted from the description.

[Image Forming System]

FIG. 13 is a schematic view of an image forming system 1S as an image forming apparatus for the present embodiment. The image forming system 1S includes a printer 1, which is the main body of the image forming apparatus, and feeding option devices 1001, 1002 as sheet feeding devices connected to the printer 1. The structure of the printer 1 is the same as in the first embodiment. The feeding option device 1001, which is directly connected to the printer 1, includes feeding units **1010*a*, 1010*b*, 1010*c*, a vertical path feeding portion 1020, an exit unit 1030, and a horizontal feeding portion 1040. A feeding option device 1002 that is connected to the printer 1 via the feeding option device 1001 also has a configuration that is substantially the same as that of the feeding option device 1001** described below.

The feeding units **1010*a*, 1010*b*, and 1010*c* have the same configuration as the feeding unit 10*a* in the first embodiment, and each feed one sheet S, the recording material, at a time. The sheet S fed from the feeding units 1010*a*, 1010*b*, 1010*c* is passed through the vertical path feeding portion 1020 to the horizontal feeding portion 1040 where multiple vertical paths feeding portions 1020 meet. Furthermore, the sheet S that has been delivered to the horizontal feeding unit 104 is delivered to the printer 1 via an exit unit 1030. The sheet S fed from the feeding option device 1002 on the right side of the figure is carried into the horizontal feeding portion 1040 of the feeding option device 1001 and is delivered to the printer 1 via the exit unit 1030**.

Figure 14:
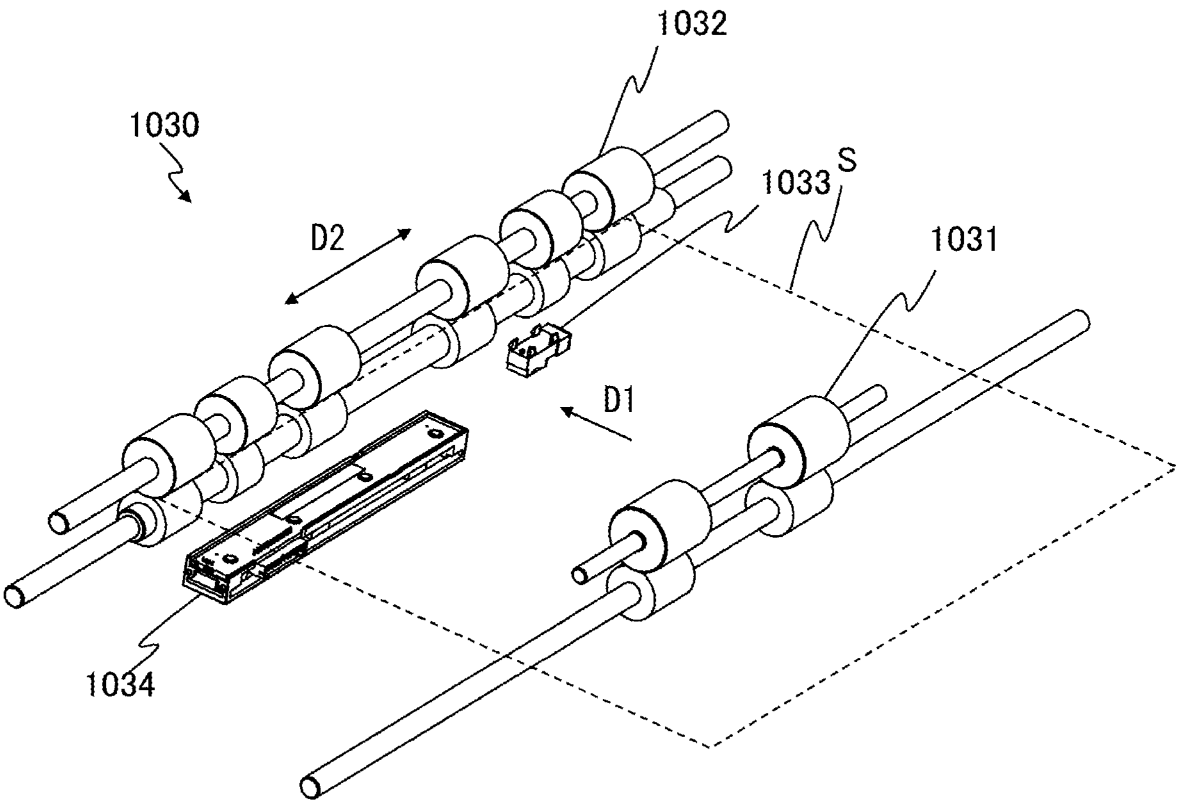
FIG. 14 is a perspective view of an exit unit of the feeding option device according to the second embodiment.

As shown in FIG. 14, the exit unit 1030 includes a pre-registration roller pair 1031 that conveys the sheet S, and a registration roller pair 1032 that corrects the oblique movement of the sheet. The exit unit 1030 further includes a registration sensor 1033 that detects the position of the sheet S in the sheet feeding direction D1, and a CIS 1034 that detects the position of the sheet S widthwise direction D2. The exit unit 1030 is the second correcting portion according to the present embodiment, a registration roller pair 1032 is the second roller pair according to the present embodiment, and CIS 1034 is the second detecting means according to the present embodiment.

The function of the exit unit 1030 is basically the same as that of the registration portion 30 of printer 1 described in the first embodiment. That is, the exit unit 1030 corrects the oblique movement by placing the tip of the sheet against the nip portion of the registration roller pair 1032, and then corrects the position of the sheet S by the shift motion of the registration roller pair 1032 in the widthwise direction D2. The exit unit 1030 feeds the sheet S, which has been corrected for oblique movement and position, to the printer 1 at a predetermined timing. The predetermined timing is, for example, the timing when the feeding option device 1001 is requested by the control portion 200 of printer 1 to deliver the next sheet S to printer 1. The details of each member of exit unit 1030 and the oblique movement correction and position correction are the same as in the registration portion 30 of the first embodiment, and are therefore omitted.

[Sheet Position Correction Control]

The control of sheet position correction for widthwise direction D2 (lateral registration shift control) by the registration portion 30 and exit unit 1030 of the image forming system 1S is explained in more detail below.

Figure 15A:
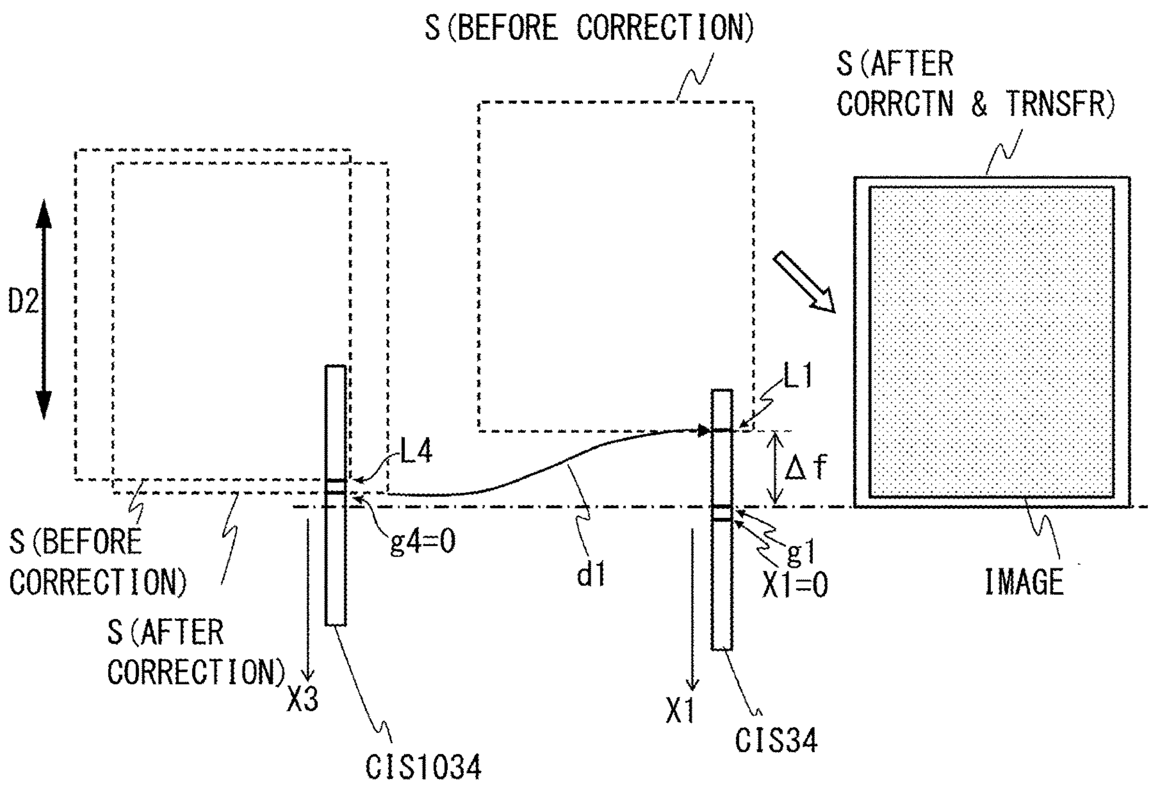
FIG. 15A is a schematic view showing the positioning of the sheets during feeding in the comparison example.
Figure 15B:
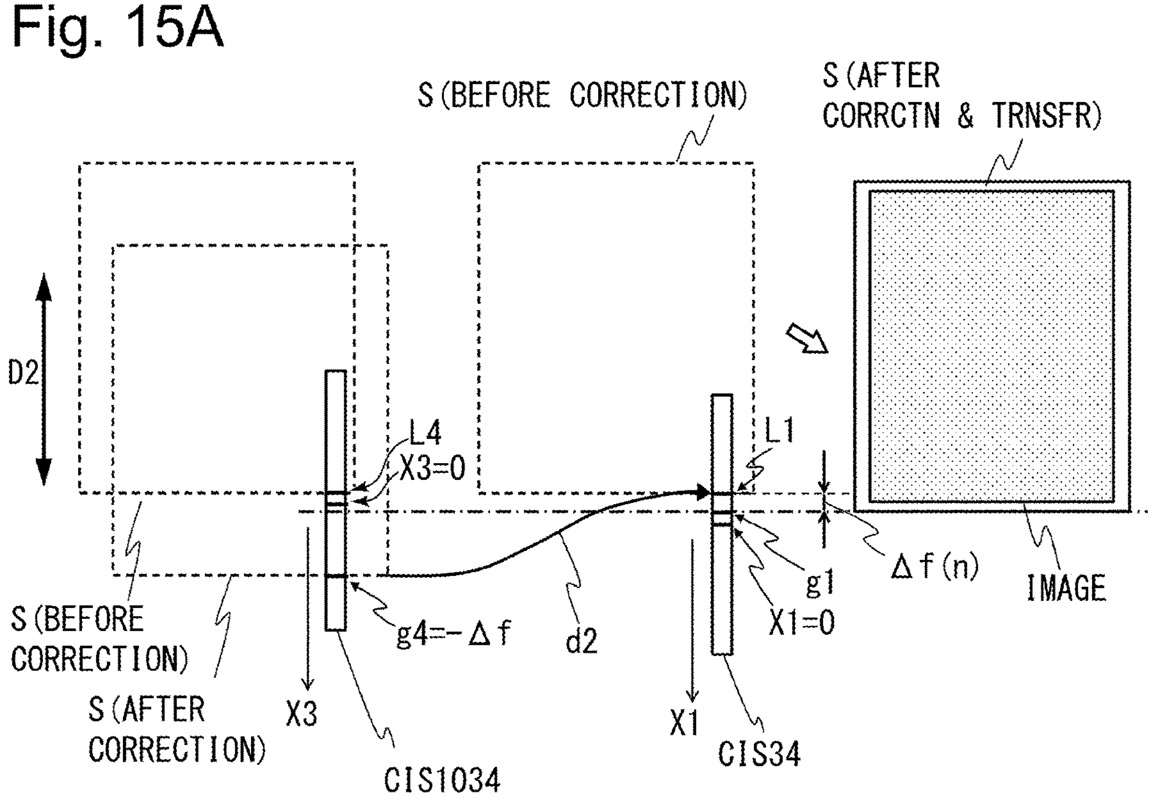
FIG. 15B is a schematic view showing the positioning of the sheets during feeding in the second embodiment.

FIG. 15A and FIG. 15B are schematic views showing the positional relationship of the sheet S that is fed from the exit unit 1030 of the feeding option device 1001 through the registration portion 30 and the secondary transfer portion T2. In the figure, the position of a sheet S in the widthwise direction D2 in the exit unit 1030 shall be represented by an X3 coordinate, and the side edge position of the sheet S detected by the CIS 1034 shall be L4. That is, the widthwise direction position of the sheet S detected by CIS 1034 is represented by X3=L4. The coordinate axis (X3 axis) is parallel to the widthwise direction D2, and the origin (X3=0) is the positive direction of X3 in the lower part of the figure relative to the origin, and the negative direction of X3 in the upper part of the figure relative to the origin. Similarly, the position of the sheet S in the widthwise direction D2 in the registration portion 30 shall be represented by an X1 coordinate, and the side edge position of the sheet S detected by the CIS 34 shall be L1.

FIG. 15A shows, as a comparison example, the case where the target position g4 of the position correction in the exit unit 1030 is set to the nominal side edge position (X3=0) of the sheet S in the CIS 1034. The target position g1 of the position correction in the registration portion 30 is the position corresponding to the image writing position g1' (S104 in FIG. 3) of the first side in the image forming portion 90.

The side edge position L4 of the sheet S detected by CIS 1034 is usually deviated from the nominal side edge position (X3=0) due to the position shift of the sheet S widthwise direction D2 that occurred before reaching CIS 1034. In this comparative example, it is assumed that the shift motion in the exit unit 1030 corrects the side edge position of the sheet S to g4=0.

After that, a position shift of the sheet S widthwise direction D2 occurs while it is being fed from the exit unit 1030 to the registration portion 30. The curve f1 in FIG. 15A shows that the side edge of the sheet S, which was corrected to the nominal position (X3=0) in exit unit 1030, has shifted position to the position of X1=L1 when it reaches CIS34 in registration portion 30.

In the case where position correction is performed in the exit unit 1030 using the nominal side edge position (X3=0) as the target position g4, the difference between the side edge position L1 of the sheet S detected by the CIS 34 in the registration portion 30 and the target position g1 for position correction in the registration portion 30 is defined as the position shift amount Δf. In the comparative example, the position shift amount Δf may be relatively large as described above, but even in that case, position correction is performed to eliminate the position shift amount Δf in the registration portion in order to transfer the image to the proper position in the secondary transfer portion T2. As a result, the shift amount of the registration roller pair 32 becomes larger, which may lead to the decrease in image quality and productivity described above.

On the other hand, in the configuration of the present embodiment shown in FIG. 15B, the target position g4 of the position correction in the exit unit 1030 is set to a pre-set offset value (g4=−Δf) for the position shift amount Δf described above. In this case, the side edge of the sheet S that has been corrected to the target position g3 at the exit unit 1030 is displaced so that it approaches the nominal position (X1=0) of the sheet side edge at the registration portion 30 (curve f2) while being fed to the registration portion 30. This is because the feeding passage from the exit unit 1030 to the registration portion 30 is identical to the case where the target position g4 is not offset, and therefore the position shift of the sheet S that occurs during feeding along this route is expected to be equal to or close to the value of Δf. Therefore, by offsetting the target position g4 from the reference position toward the opposite side of the position shift amount Δf in advance, the side edge position L1 of the sheet S when it reaches the registration portion 30 can be brought closer to the target position g1 for position correction in the registration portion 30.

[Acquisition of the Target Position g4 of the Sheet in the Widthwise Direction]

The method of acquiring the target position g4 for position correction of the sheet S in the exit unit 1030 is described below using the flowchart in FIG. 16. Each process in this flowchart is realized by the CPU 201 of the control portion 200 (FIG. 8) executing the control program and issuing instructions to each module of the control portion 200 as necessary. The method of acquiring the target positions g1 and g2 for position correction in the registration portion 30 is performed according to the flow described in FIG. 10.

Figure 16:
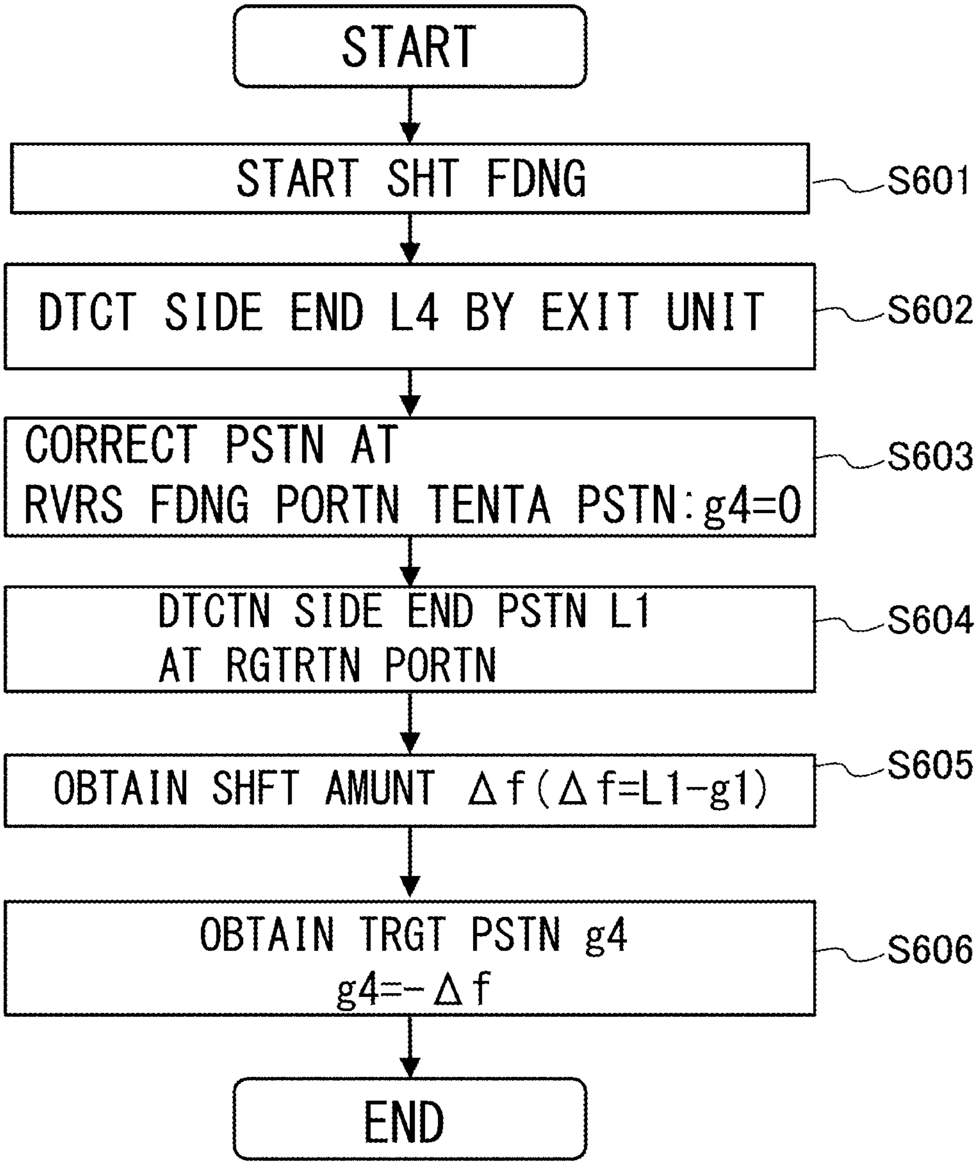
FIG. 16 is a flowchart showing the process of acquiring the target position for position correction in the reverse feeding portion according to the first embodiment.

FIG. 16 shows the acquisition flow of the target position g4 for position correction in the exit unit 1030. The process in this flowchart is performed separately from the print job for the user to obtain the print deliverables, as an adjustment process before shipment from the factory, as an initial setup operation when the equipment is installed, or as a maintenance operation performed by the user or service personnel after installation. In other words, the controller of the present embodiment can run the acquisition process to acquire the offset amount of the target position g4 separately from the job to obtain the printed deliverables.

First, a sheet S is fed from the feeding units 1010*a*, 1010*b*, 1010*c* of the feeding option devices 1001 and 1002 as a measuring sheet and fed to the exit unit 1030 (S601). Then, the CIS 1034 of the exit unit 1030 detects the side edge position L4 of the sheet S (S602). Next, the nominal position of the CIS 1034 is set to a tentative target position (g4=0), and the position of the sheet S is corrected (S603). In other words, the shift control portion 208 (FIG. 8) executes the shift motion of the registration roller pair 1032 based on the detection result of the CIS 1034, targeting the preset reference position (g4=0) (see FIG. 9A). The sheet S is then received by the printer 1 and fed to the registration portion 30.

In the registration portion 30 of printer 1, the side edge position L1 of sheet S is detected by CIS 34 (S604). The difference between the side edge position L2 of the sheet S detected in the registration portion 30 and the target position g1 acquired in advance according to the acquisition flow in FIG. 10 is acquired as the position shift amount Δf (see FIG. 15A) (S605). Then, the target position for position correction in the exit unit 1030 is set to g4=−Δf (S606). In other words, the shift control portion 208 (FIG. 8) sets the target position g4 for position correction in the exit unit 1030 based on the difference between the side edge position L1 of the sheet S detected in the registration portion 30 and the target position g1 for position correction in the registration portion 30. In other words, the controller determines the offset amount to offset the second position from the reference position when the job is executed, based on the position shift amount obtained by the acquisition process executed prior to the execution of the job to obtain the printed deliverables. As a result, the target position g4 for position correction at the exit unit 1030 will be offset by the position shift amount Δf that occurs during feeding from the exit unit 1030 to the registration portion 30 (see FIG. 9B).

[Updating the Information of the Target Position g4 of the Sheet in the Widthwise Direction]

Furthermore, in the present embodiment, after the above target position g4 has been set, the process of updating the target position g4 is performed during the execution of a print job to output the printed deliverables. Specifically, during the execution of a print job, the position shift amount shown as Δf(n) in FIG. 15B is monitored. Δf(n) is the difference (Δf (n)=L1−g1) between the side edge position L1 of the nth sheet S that has reached the registration portion 30 after being corrected for position in the exit unit 1030 and the target position g1 corresponding to the image writing position g1'.

Figure 17:
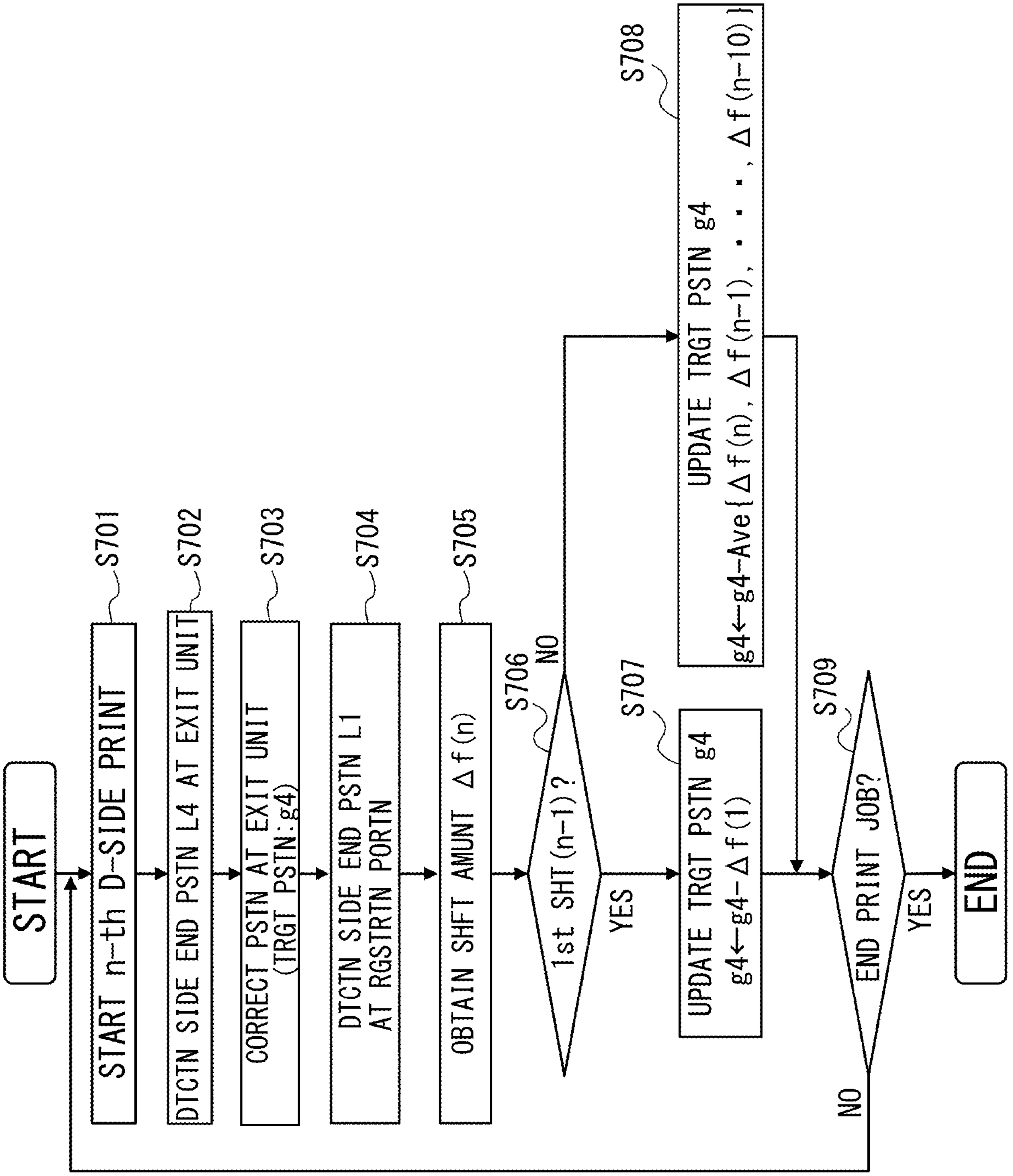
FIG. 17 is a flowchart showing the process of updating the target position for position correction in the reverse feeding portion according to the first embodiment.

Using FIG. 17, the flow of the process to update the target position g4 for position correction in the exit unit 1030 is explained. Each process in this flowchart is realized by the CPU 201 of the control portion 200 (FIG. 8) executing the control program and issuing instructions to each module of the control portion 200 as necessary. This flowchart is executed in parallel with the print job processing (FIG. 3) when a double-sided print job is executed.

First, a sheet S is fed from the feeding units 1010*a*, 1010*b*, 1010*c* of the feeding option devices 1001 and 1002 (S701), and is fed to the exit unit 1030. Then, the side edge position L4 of the sheet S is detected by the CIS 1034 of the exit unit 1030 (S702), and the position of the sheet S is corrected based on the current value of the target position g4 (S703). In other words, the shift control portion 208 executes the shift motion of the registration roller pair 1032 based on the side edge position L4 detected by the CIS 1034 and the current value of the target position g4, and corrects the side edge position of the sheet S to the target position g4 (S703). The shift amount (correction amount of the side edge position) of the registration roller pair 1032 in this shift motion is L4-g4.

When the sheet S whose position has been corrected by the exit unit 1030 is fed to the registration portion 30, the side edge position L1 is detected by the CIS 34 of the registration portion 30 (S704). Then, the difference Δf (n) between the side edge position L1 of the sheet S detected by the CIS 34 and the target position g1 of the position correction in the registration portion 30 corresponding to the image writing position g1' is obtained (S705). In other words, the shift control portion 208 obtains Δf(n) as the position shift amount of the side end position L1 detected by the CIS 34 relative to the target position g1.

If it is the first sheet in the current print job (S706: Yes), the target position g4 is updated to the value obtained by subtracting Δf(1) from g4 obtained in the flow of FIG. 16 (g4−Δf(1)) (S707). If the current sheet S is the second or later sheet (S706: No), the target position g4 is updated with the value obtained by subtracting the average value of Δf(n) for the predetermined number of predetermined sheets from the current g4 (S708). For example, to update the target position g4 using the results of the last 10 measurements, the following formula can be used.

$$g4 \leftarrow g4 - Ave\{\Delta f(n), \Delta f(n-1), \ldots, \Delta f(n-10)\}$$

Here, g4 is updated using the results of the last 10 measurements, but the results of any number of measurements, two or more, may be used. The above process (S701 to S708) is repeated for each sheet specified in the print job (S709: No), and when the process for all sheets is completed (S709: Yes), the flow ends.

In this manner, in the present embodiment, the target position g4 applied to the subsequent sheet is updated based on the difference Δf(n) between the side edge position L1 of the preceding sheet and the target position g1 detected by the registration portion 30 during the execution of the print job. In other words, the controller updates the offset amount that offsets the second position from the reference position for a subsequent sheet that follows the preceding sheet in the plurality of sheets based on the position shift amount for the first position of the sheet detected by the first detecting means for the preceding sheet in the plurality of sheets during execution of a job that forms images on the plurality of sheets. This further reduces the position shift of the side edge position L1 of the sheet S that arrives at the registration portion 30 after position correction using the updated target position g4 compared to the target position g4 before the update, relative to the target position g1. Therefore, it is possible to further reduce the shift amount of the registration roller pair 32 when performing position correction in the registration portion 30.

The method of controlling the shift amount in the reverse feeding portion 130 described in the first embodiment and the method of controlling the shift amount in the feeding option device 1001 described in the second embodiment can be used together in a single image forming apparatus.

Other Embodiments

The embodiments described above are intended to explain the technology pertaining to the present invention in more detail, and the scope of the present technology is not limited to these examples. For example, the above embodiments describe an image forming apparatus with an intermediate transfer method in which the image formed on the image bearing member (electrophotographic photosensitive member) is transferred to the sheet via an intermediate transfer material. However, the present technology is also applicable to an image forming apparatus of the direct transfer method, in which the image is directly transferred from the image bearing member to the sheet. In this case, the transfer portion is the nip portion formed between the image bearing member and the transfer portion material such as the transfer roller opposite it. In addition, in the direct transfer method, the transfer portion material such as the transfer roller facing the image bearing member functions as a transfer means.

As a variant of the above-mentioned embodiments, it is possible that the offset amount of the target positions g3 and g4 is not determined before the execution of a double-sided printing job, but the offset amount is determined by obtaining the position shift amount Δd and Δf using the sheets during the job execution. In that case, the shift amount of the registration roller pair 32 in the registration portion 30 may be large until the offset of the target positions g3 and g4 is performed. The present embodiment has the advantage that the shift amount of the registration roller pair 32 can be reduced from the first sheet in a double-sided printing job because the offset amounts of the target positions g3 and g4 are obtained in advance by the acquisition process in FIG. 11 or FIG. 16.

Moreover, the method of determining the offset amount of the target position g3 in the reverse feeding portion 130 is not limited to the ones described above. For example, in the acquisition process of the target position g3 before the printer 1 starts to be used (FIG. 11), the average value of the position shift amount Δd obtained for multiple measuring sheets may be determined as the initial offset amount.

The present invention can also be realized by supplying a program that realizes one or more of the functions of the embodiments described above to a system or apparatus via a network or storage medium, and having one or more processors in the computer of the system or apparatus read and execute the program. It can also be realized by a circuit (e.g., ASIC) that realizes one or more functions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-046123 filed on Mar. 19, 2021, which is hereby incorporated by reference herein in its entirety.

What is claimed is:

1. An image forming apparatus comprising:

an image forming portion including (1) an image bearing member configured to bear an image and (2) a transfer portion configured to transfer the image formed on said image bearing member to a sheet;

a first correcting portion including (1) a registration roller pair for correcting oblique movement of the sheet, the registration roller pair being configured to nip and feed the sheet and being movable in a widthwise direction perpendicular to a sheet feeding direction, and (2) a first detecting means for detecting a sheet position with respect to the widthwise direction, wherein said first detecting means comprises a sensor, and wherein said first correcting portion corrects a position of the sheet in the widthwise direction by said registration roller pair on the basis of a detecting result of said first detecting means;

a second correcting portion including (1) a reversing roller pair for reversing the feeding direction of the sheet, the reversing roller pair being configured to nip and feed the sheet and being movable in the widthwise direction and (2) a second detecting means for detecting the sheet position with respect to the widthwise direction, wherein said second detecting means comprises a sensor, and wherein said second correcting portion corrects the position of the sheet in the widthwise direction by said reversing roller pair on the basis of a detecting result of said second detecting means; and a controller configured to control said first correcting portion and said second correcting portion, wherein said controller, in a case in which the sheet is fed to said transfer portion, to form the image on the sheet, via said first correcting portion from said second correcting portion, (1) causes said second correcting portion to correct the position of the sheet to a second position, and (2) causes said first correcting portion to correct the position of the sheet to a first position to be aligned with the image transferred in said transfer portion, and wherein, when a previous sheet has been moved to a third position of said second detecting means by said reversing roller pair and then the previous sheet is detected at a previous sheet position by said first detecting means, the second position is a position offset from the third position of said second detecting means toward an opposite side to a direction where the previous sheet position detected by said first detecting means is shifted from the first position.

2. An image forming apparatus according to claim 1, wherein said controller is capable of executing an obtaining process for feeding the previous sheet to said second correcting portion, moving the previous sheet to the third position by said reversing roller pair, then feeding the previous sheet to said first correcting portion, and obtaining a position shift amount of the position of the previous sheet detected by said first detecting means with respect to the widthwise direction to the first position, and wherein, in a case of executing a job forming the image on the sheet, said controller determines an offset amount to offset the second position from the third position during the execution of the job on the basis of the position shift amount obtained by said obtaining process executed before the execution of the job.

3. An image forming apparatus according to claim 2, wherein, during the execution of a job forming the image on a plurality of sheets, said controller updates the offset amount to offset the second position from the third position with respect to a subsequent sheet following a preceding sheet among the plurality of sheets on the basis of the position shift amount of the position of the sheet, detected by said first detecting means with respect to the preceding sheet among the plurality of sheets, to the first position.

4. An image forming apparatus according to claim 1, further comprising a second reversing roller pair configured to (1) nip the sheet with said reversing roller pair and reverse the feeding direction of the sheet, and (2) move with said reversing roller pair in the widthwise direction.

5. An image forming apparatus according to claim 1, further comprising a guiding member configured to form a space in which the sheet is temporarily accommodated in a case in which the sheet is reversed by said reversing roller pair, wherein in the case in which the sheet is reversed by said reversing roller pair, a first surface of the sheet is guided by said guiding member and another guided member guiding a second surface of the sheet opposite to the first surface is not provided in the space.

6. An image forming apparatus according to claim 1, wherein, in a case of forming the image on a second surface of the sheet opposite to the first surface, said controller causes said registration roller pair to move the sheet with respect to the widthwise direction by a first movement amount and causes said reversing roller pair to move the sheet with respect to the widthwise direction by a second movement amount larger than the first movement amount.

7. An image forming apparatus according to claim 1, wherein said sensor of said first detecting means comprises a contact image sensor, and wherein said sensor of said second detecting means comprises a contact image sensor.

8. An image forming apparatus according to claim 6, wherein said sensor of said first detecting means comprises a contact image sensor, and wherein said sensor of said second detecting means comprises a contact image sensor.

9. An image forming apparatus according to claim 1, further comprising:

a first casing configured to accommodate said image forming portion and said first correcting portion; and a second casing connected to said first casing and configured to accommodate said second correcting portion such that said second correcting portion receives the sheet between itself and said first casing.

* * * * *